(12) United States Patent
Holder

(10) Patent No.: US 11,691,512 B2
(45) Date of Patent: Jul. 4, 2023

(54) CONTROL SYSTEM AND COMPONENTS THEREFOR

(71) Applicant: Holder Industries Limited, Hamilton (NZ)

(72) Inventor: James Tamati Holder, Hamilton (NZ)

(73) Assignee: James Tamati Holder, Hamilton (NZ)

( * ) Notice: Subject to any disclaimer, the term of this patent is extended or adjusted under 35 U.S.C. 154(b) by 0 days.

(21) Appl. No.: 17/271,415

(22) PCT Filed: Aug. 27, 2019

(86) PCT No.: PCT/NZ2019/050108
§ 371 (c)(1),
(2) Date: Feb. 25, 2021

(87) PCT Pub. No.: WO2020/046140
PCT Pub. Date: Mar. 5, 2020

(65) Prior Publication Data
US 2021/0339631 A1    Nov. 4, 2021

(30) Foreign Application Priority Data

Aug. 27, 2018 (NZ) ........................................ 745719

(51) Int. Cl.
*B60K 37/06*    (2006.01)
*B60T 8/26*    (2006.01)
(Continued)

(52) U.S. Cl.
CPC ................ *B60K 37/06* (2013.01); *B60T 8/26* (2013.01); *G05G 1/08* (2013.01); *G05G 5/065* (2013.01);
(Continued)

(58) Field of Classification Search
CPC .............. B60K 37/06; B60K 2370/126; B60K 2370/1537; B60T 8/26; G05G 1/08;
(Continued)

(56) References Cited

U.S. PATENT DOCUMENTS 2,532,970 A    12/1947  Van Dyke
2,539,575 A    1/1951   George
(Continued)

FOREIGN PATENT DOCUMENTS

CN    203580927 U    5/2014
DE    3419499 A1     11/1985
(Continued)

OTHER PUBLICATIONS

Define printed circuit board, Microsoft Bing, Sep. 13, 2022 (Year: 2022).*
(Continued)

*Primary Examiner* — Vinh Luong
(74) *Attorney, Agent, or Firm* — Tarolli, Sundheim, Covell & Tummino L.L.P.

(57) ABSTRACT

Brake adjustment dials, systems, and components adjust the brake bias in a vehicle. In one example, a brake bias adjustment dial includes an electronic display, an adjustment mechanism that transfers rotational torque to a shaft, and a rotation prevention feature that compensates the rotation of the adjustment mechanism to maintain the image displayed on the electronic display in a substantially fixed orientation with respect to a mounting.

32 Claims, 29 Drawing Sheets

(51) Int. Cl.
*G05G 1/08* (2006.01)
*G05G 5/06* (2006.01)
*F16C 1/02* (2006.01)

(52) U.S. Cl.
CPC .................. *B60K 2370/126* (2019.05); *B60K 2370/1537* (2019.05); *F16C 1/02* (2013.01)

(58) Field of Classification Search
CPC ............ G05G 5/065; G05G 1/10; F16C 1/02; H01H 25/065; H01H 25/06; H01H 19/14; H01H 19/025; H01H 2219/06; H01H 2219/066
See application file for complete search history.

(56) References Cited

U.S. PATENT DOCUMENTS

| | | | |
|---|---|---|---|
| 2,658,395 A | 11/1953 | Coates | |
| 2,805,636 A | 12/1954 | Gach | |
| 2,746,417 A | 5/1956 | McCord et al. | |
| 2,980,055 A | 4/1961 | Burns | |
| 3,136,294 A | 6/1964 | Arnold et al. | |
| 3,895,600 A | 7/1975 | DeLong | |
| 3,934,939 A | 1/1976 | Hida | |
| 3,949,702 A | 4/1976 | DeLong | |
| 3,991,702 A | 11/1976 | Taylor | |
| 4,016,755 A | 4/1977 | Anderberg et al. | |
| 4,117,320 A | 9/1978 | Tomlinson et al. | |
| 4,499,370 A | 2/1985 | Nishiuchi | |
| 4,776,438 A | 10/1988 | Schandelmeier | |
| 5,646,849 A | 7/1997 | Walenty et al. | |
| 5,697,260 A | 12/1997 | Rixon et al. | |
| 5,819,593 A | 10/1998 | Rixon et al. | |
| 5,819,597 A * | 10/1998 | Sato ..................... | H01H 19/005 74/553 |
| 5,950,245 A | 9/1999 | Binduga | |
| 6,192,605 B1 | 2/2001 | Challant | |
| 6,209,687 B1 | 4/2001 | Hundley | |
| 6,263,994 B1 | 7/2001 | Eitel | |
| 6,357,291 B1 | 3/2002 | Jenness et al. | |
| 6,457,208 B1 | 10/2002 | Keith | |
| 6,516,683 B2 | 2/2003 | Sundaresan et al. | |
| D472,947 S | 4/2003 | Wu | |
| 9,139,177 B1 * | 9/2015 | Bolenbaugh ............ | B60T 8/267 |
| 9,266,509 B1 | 2/2016 | Nesbitt | |
| 9,441,713 B2 | 9/2016 | Nesbitt | |
| 9,911,556 B2 | 3/2018 | Lee et al. | |
| 10,847,330 B2 * | 11/2020 | Dooley .................. | H01H 19/14 |
| 2002/0166408 A1 | 11/2002 | Willemsen | |
| 2003/0056615 A1 | 3/2003 | Oberheide et al. | |
| 2005/0016319 A1 | 1/2005 | Kiczek et al. | |
| 2005/0160869 A1 | 7/2005 | Willemsen et al. | |
| 2006/0207867 A1 * | 9/2006 | Waddington ........... | H01H 9/181 200/315 |
| 2006/0266190 A1 | 11/2006 | Saitou et al. | |
| 2008/0023309 A1 * | 1/2008 | Montalvo ............ | H01H 19/025 200/332 |
| 2009/0127078 A1 * | 5/2009 | Hostmann .............. | H01H 25/06 200/4 |
| 2010/0319479 A1 * | 12/2010 | Sjolin ...................... | G05G 1/10 74/504 |
| 2015/0260346 A1 | 9/2015 | Ligonesche et al. | |
| 2016/0146315 A1 * | 5/2016 | Nesbitt .................... | B60T 8/26 74/501.6 |
| 2016/0189896 A1 * | 6/2016 | Lee ........................ | H03K 17/97 200/313 |
| 2016/0348767 A1 | 12/2016 | Nesbitt | |
| 2018/0298959 A1 * | 10/2018 | Battlogg ............... | F16D 57/002 |
| 2019/0167042 A1 * | 6/2019 | Charopoulos .......... | H01H 36/00 |
| 2019/0189368 A1 * | 6/2019 | Yu ........................... | H01H 9/18 |
| 2021/0309108 A1 * | 10/2021 | Sanchez ................. | B60T 7/042 |

FOREIGN PATENT DOCUMENTS

| | | | |
|---|---|---|---|
| DE | 19749314 A1 | 5/1999 | |
| DE | 10044130 C1 | 1/2002 | |
| DE | 102011114051 A1 | 3/2013 | |
| EP | 0506895 A1 | 10/1992 | |
| ES | 2076884 A2 | 11/1995 | |
| GB | 726768 A | 3/1955 | |
| GB | 1159359 | 7/1969 | |
| GB | 1244428 | 9/1971 | |
| GB | 1420382 | 1/1976 | |
| GB | 1603756 A | 11/1981 | |
| GB | 2093240 A | 8/1982 | |
| JP | 2004076820 A | 3/2004 | |
| WO | WO 2018191232 A1 * | 10/2018 | |
| WO | WO 2020083697 A1 * | 4/2020 | .......... H03K 17/968 |

OTHER PUBLICATIONS

SiKO—DKE01 Control Knob—https://www.siko-global.com/en-us/products/positionline-position-indicators/control-knobs/dke01.
Brake O Meter—https://brakeometer.com/.
Brake Bias Adjuster Short Crank Type, Allstar Performance, https://allstarperformance.com/brake-bias-adjuster-short-crank-type-3-8-all42078/, May 24, 2021.
Cable Type with Digital Read-out CP2905-15, AP Racing, https://apracing.com/race-car/pedal-boxes/balance-bar-cable-adjuster/cable-type-with-digitai-read-out-cp2905-15, May 24, 2021.
Dial Diasplay Brake Bias Adjuster—Adjuster Only—Howe Racing Enterprises, Inc, https://howeracing.com/collections/braking-brake-bias-adjusters/products/dial-diasplay-brake-bias-adjuster-adjuster-only, May 24, 2021.
International Search Report for Application No. PCT/NZ2019/050108 dated Dec. 11, 2019.
International Preliminary Report on Patentability for Application No. PCT/NZ2019/050108 dated Aug. 12, 2020; 4 pgs.

* cited by examiner

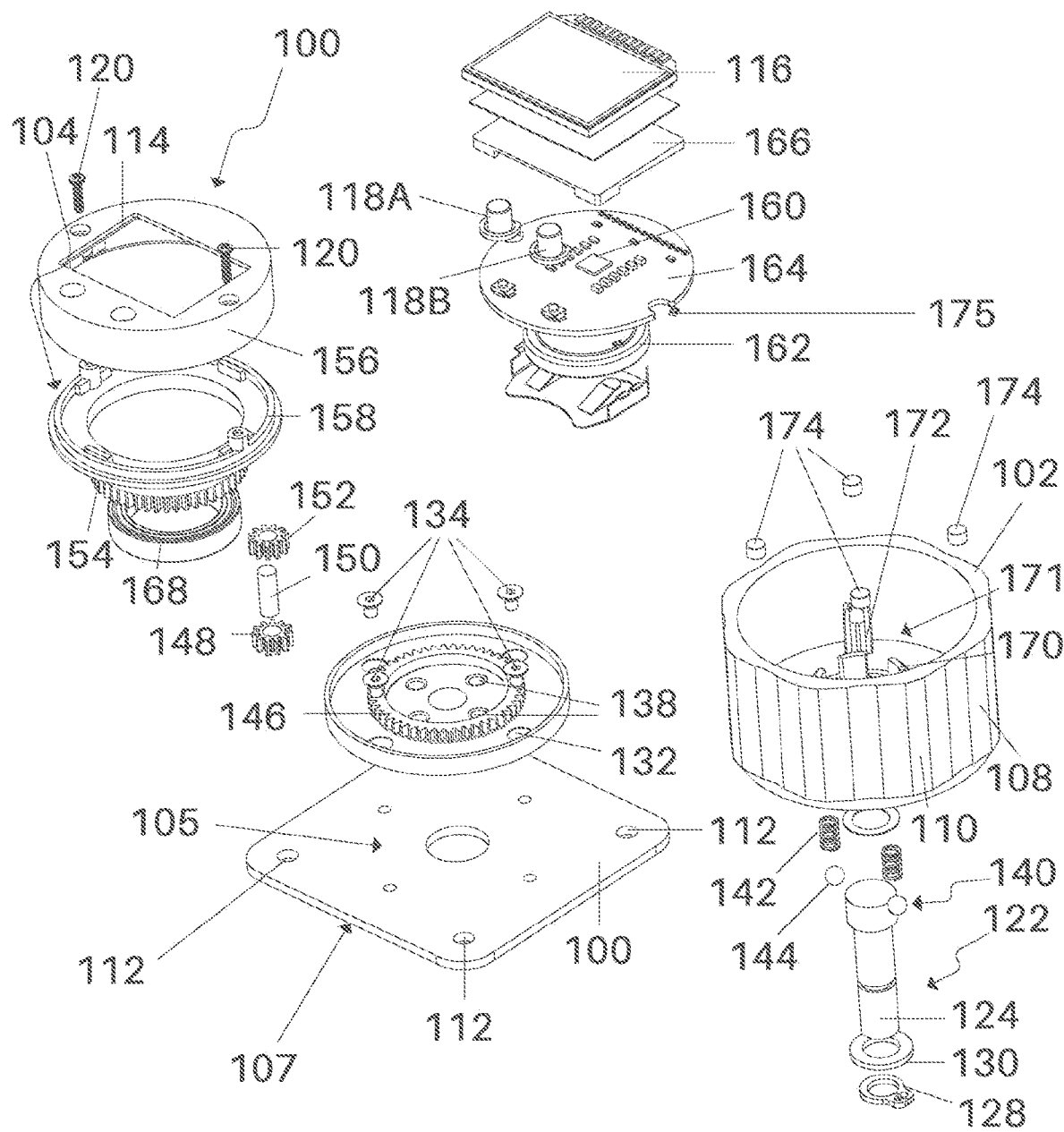

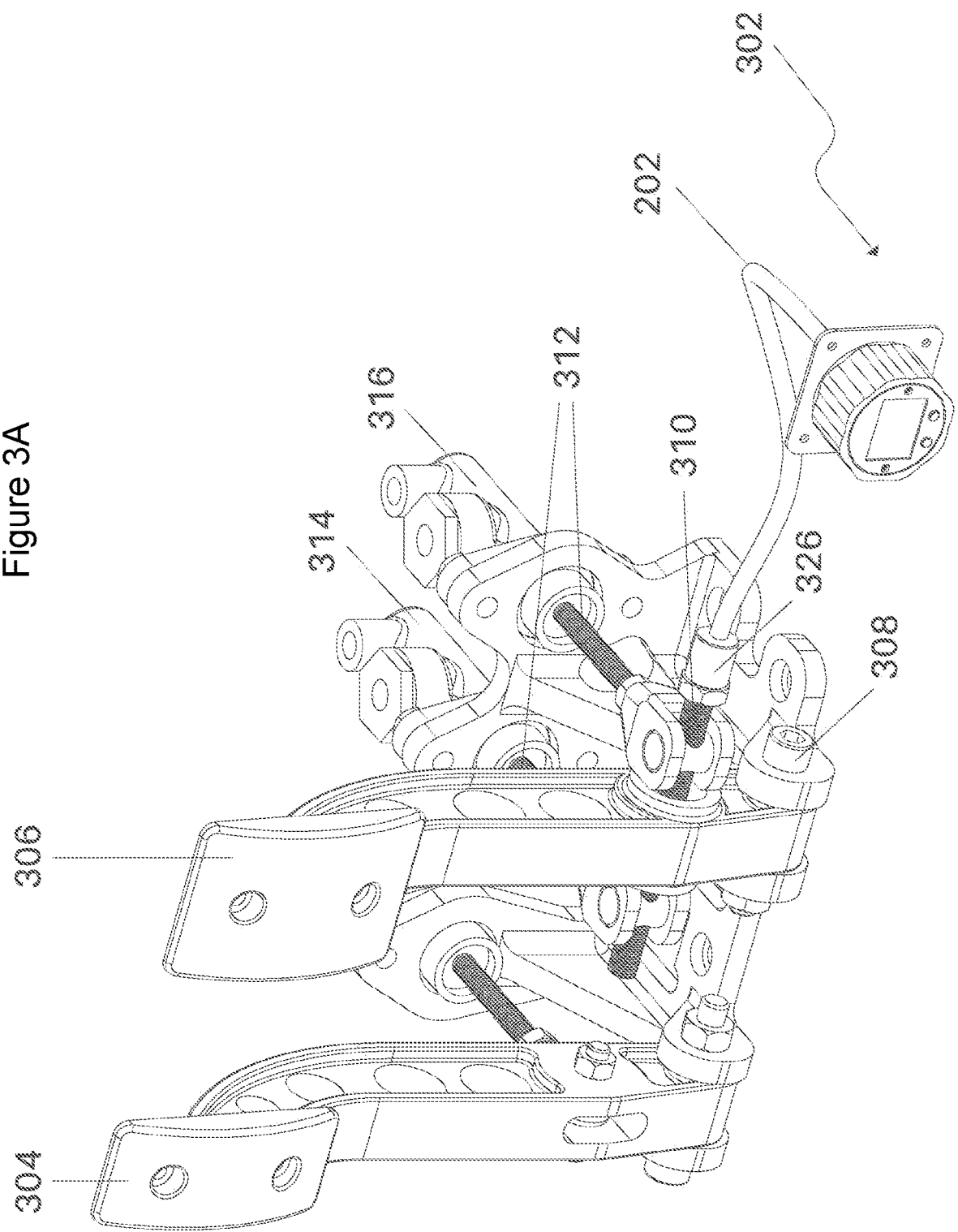

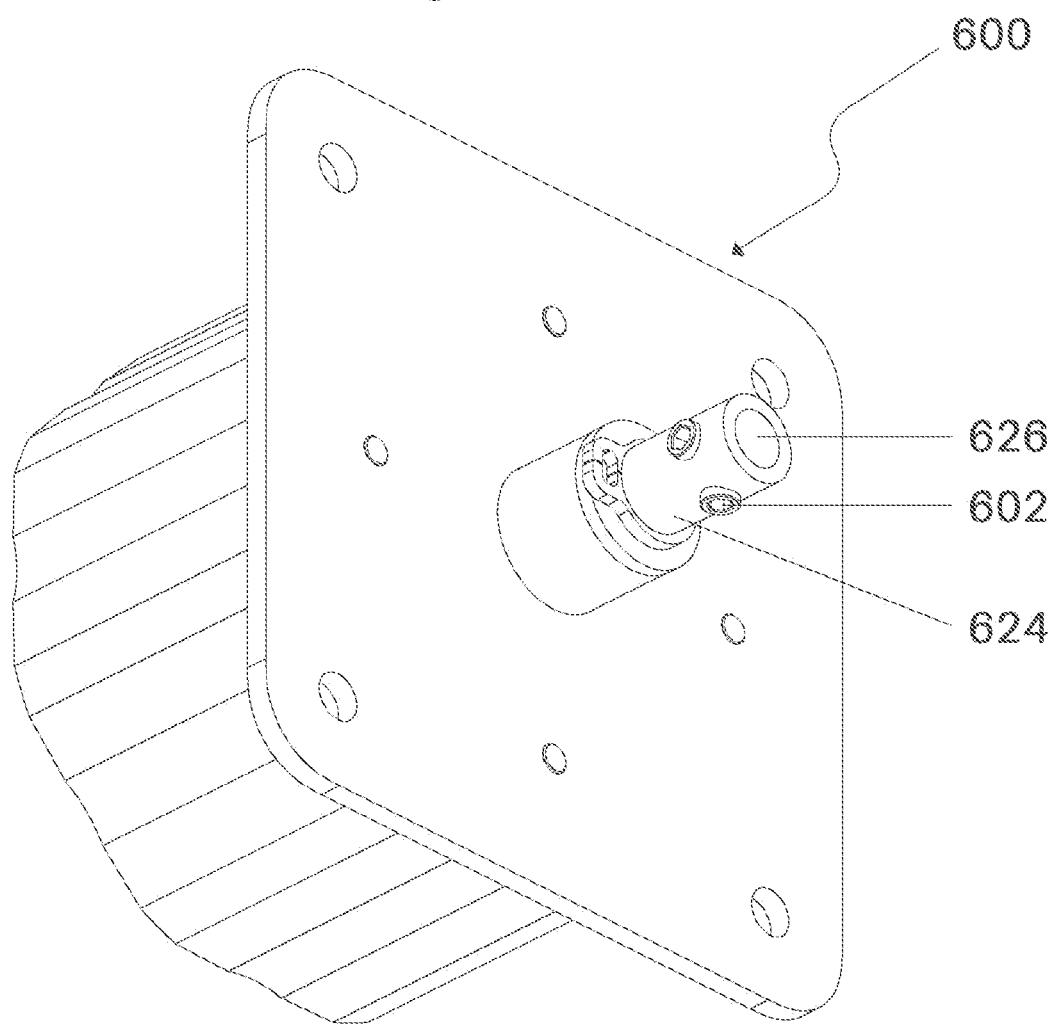

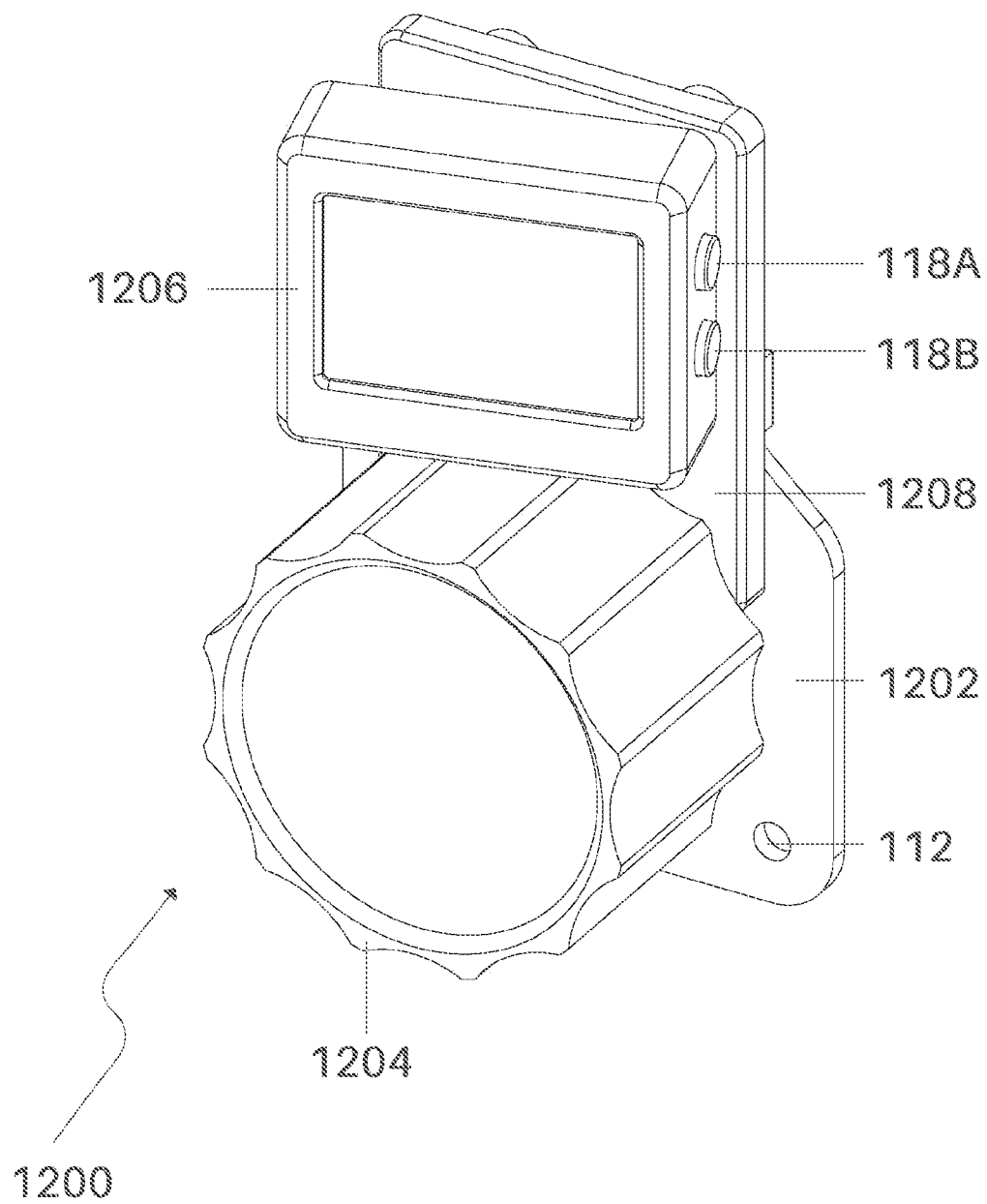

CONTROL SYSTEM AND COMPONENTS THEREFOR

RELATED APPLICATIONS

The present invention is a U.S. National Stage under 35 USC 371 patent application, claiming priority to Serial No. PCT/NZ2019/050108, filed on 27 Aug. 2019; which claims priority of NZ 745719, filed on 27 Aug. 2018, the entirety of both of which are incorporated herein by reference.

TECHNICAL FIELD

The present invention relates to a control system and components therefor. This control system may find particular application in adjusting the brake bias of a vehicle such as a race car. However, this should not be seen as limiting on the scope of the invention.

BACKGROUND TO THE INVENTION

Vehicles have brake systems to allow a driver to slow down and stop as required. It is important to ensure that these brake systems operate efficiently so that the vehicle can slow down or stop quickly and safely.

The efficiency and effectiveness of the brake system is dependent on a number of factors such as the weight distribution of the vehicle, the amount of tread on the tyres, the temperature of the tyres, and the surface that the vehicle is travelling across. Many of these factors are dynamic and change as the vehicle is being driven. Therefore, to maintain effective and efficient braking there is a need to adjust the brake system to compensate for these factors.

One method of improving the braking efficiency of a vehicle is to apply differential braking forces to the vehicle's wheels e.g. at least one of the front wheels compared to at least one of the rear wheels. This difference in braking force is known as a brake bias.

There are several known control systems for adjusting the brake bias in a vehicle. Some of these control systems must be used while the vehicle is stationary and may require a skilled mechanic to make the adjustment(s). One downside to these control systems is that they cannot be set while the vehicle is in use. As such they cannot account for dynamic changes to the vehicle such as changing weight distribution due to fuel loading.

Another type of arrangement for adjusting the brake bias in a vehicle is an "electronic brake force distribution" (EBD) system. EBD systems often work in conjunction with an anti-lock brake system (ABS) to automatically adjust the brake bias between the front wheel(s) and the rear wheel(s) to ensure that the vehicle is able to brake efficiently without the wheels locking up.

These electronic control systems may be suitable for most commercial vehicles. However, when it comes to high-performance racing, it is often desirable for the driver to have control of the brake bias of the vehicle, so they may make adjustments in real time.

Providing this real time control of the vehicle's brake bias allows a skilled driver to account for a number of dynamic factors. For instance, a driver may want to adjust brake bias to account for the temperature of the tyres, the wear of the tyres, the conditions of the track, the vehicles suspension, how much fuel the vehicle is carrying, whether the driver is about to apply the brakes while the vehicle is travelling in a straight line or cornering. Skilled drivers are able to feel how the vehicle responds under different braking conditions and adjust the brake bias to achieve their desired performance. The ability to adjust brake bias in real time therefore means that a driver can easily adjust brake bias to account for changes experienced during a given drive period without needing to stop or rely on a mechanic.

Control systems which provide real time control over the brake bias in a vehicle are known. These control systems typically include a control knob mounted in the vehicle within the reach of the driver. These control knobs typically attach directly to a flexible cable which in-turn connects to components which adjust the vehicle's brake bias.

It is important that these real-time control systems are simple for the operator to use and are able to provide feedback as to how the brake bias has been configured. Incorrect or sub-optimal setting of brake bias can adversely affect vehicle performance, particularly during racing. For instance, if the brake bias is configured with excess bias towards a/the rear wheel(s), then under heavy braking conditions the rear wheel(s) may lock-up, which could cause a potentially dangerous loss of traction.

In addition, some drivers may have a preferred brake bias setting. This preferred setting may for example be a preferred bias for straight line braking, or for use on a specific surface such as tarmac. There is therefore a need to be able to adjust the brake bias to their preference while driving.

Furthermore, given the demands on the driver's attention (particularly while racing), and the potentially catastrophic results of an incorrectly set brake bias, it is advantageous to provide a brake bias adjustment system which allows a driver to quickly see whether the bias is appropriately set.

Providing a visual indication of the current setting of the brake bias gives the driver the confidence to freely adjust the brake bias and then be able to return the bias setting back to the previously set position if the new position is not found to be more favourable.

A common situation where this may occur is when the driver undertakes a testing session prior to a competitive event. During this testing session they will determine the preferred position of many adjustable settings on the car, including brake bias. However, during the competitive event the driver may feel that the brake bias could be adjusted to reflect the race conditions and factors such as the road conditions or the driver's perception of the vehicles response under braking. Without a visual indication of the position of the brake bias the driver may be reluctant to undertake these adjustments to the brake bias as they may struggle to return to the previously determined preferred setting. The resulting outcome is that, for many drivers, the best brake bias position for the current conditions may not be being applied. This in turn will result in less effective braking than that which could be achieved and therefore a worst competitive event result than that was possible.

There are other situations when it may be desirable to provide a way to clearly identify the current brake bias setting. For instance, in certain types of racing different brake bias settings may be required at different stages/times of the race. Two examples of situations when this would be beneficial are during endurance racing when there is a driver change, and a surface change during a rally stage, e.g. from tarmac to gravel.

An example of a manual system for the control of brake bias adjustment in real time is described in U.S. Pat. No. 9,266,509. However, this system has a number of limitations. For example, it is difficult for an operator to quickly determine how the bias has been set because the numbers that provide feedback to the brake bias setting are small and partly obscured, and it does not have a default or reset setting.

Maximising the viewable area of a display in a compact space is a technical challenge that is not easy to overcome.

Other manual control systems are known which include a simple mechanical adjustment dial and a detached external display. To detect rotation of the dial, these systems mount a bulky sensing arrangement on the rear of the dial that interfaces to the external display. This approach is relatively complex and expensive to manufacture, it also requires more space in the vehicle for installation and has a display which is visually disconnected from the adjustment dial.

Dials are also known which incorporate a display. However, these dials are typically electronic in nature. For instance, an air-conditioning dial in a vehicle does not directly rotate a mechanical shaft as the dial is turned. Rather an electronic control system detects the rotation and controls a separate actuator to make the adjustment. The systems are not desirable for the control of brake bias in a vehicle as they cannot be retrofitted in the place of an existing mechanical dial. Furthermore, these systems require a greater power draw to drive the actuators which means that they need to be wired into the power system of the vehicle or to have a relatively large capacity battery. These points can make them cumbersome to install or otherwise unsuitable for a given use.

OBJECT OF THE INVENTION

It is an object of the present invention to provide a control system and components therefor. It is also an object of the invention to provide a control system and components therefor that are suitable for use in a brake bias adjustment system.

Alternatively, it is an object of the present invention to provide a control system that incorporates an electronic display to enable the user to more easily see at a glance how brake bias has been set.

Alternatively, it is an object of the present invention to provide a control system and components therefor which may allow an operator to reset the display.

Alternatively, it is an object of the present invention to provide a control system and components therefor that can be programmed to show at least one preferred setting, for features such as brake bias adjustment applied to the wheel(s) of a vehicle.

Alternatively, it is an object of the present invention to provide a control system and components therefor that includes a memory function to store brake bias adjustment applied to the wheel(s) of a vehicle.

Alternatively, it is an object of the present invention to provide a compact control system and components therefor that are easily installed.

Alternatively, it is an object of the present invention to provide a control system and components therefor which are more cost effective to manufacture.

Alternatively, it is an object of the present invention to at least provide the public with a useful choice.

SUMMARY OF THE INVENTION

According to a first aspect of the present invention, there is provided an adjustment device for the adjustment of brake bias in a vehicle, the device comprising:
a mounting,
an electronic display,
an adjustment mechanism, and
an attachment portion,
wherein in use, rotation of the adjustment mechanism causes rotation of the attachment portion.

According to a further aspect of the present invention there is provided a control system for the adjustment of brake bias in a vehicle, the system comprising:
an adjustment device, and
a shaft;
wherein the adjustment device includes
a mounting,
an electronic display,
an adjustment mechanism, and
an attachment portion connected to the shaft,
wherein in use, rotation of the adjustment mechanism causes rotation of the shaft, and
further wherein rotation of the shaft facilitates adjustment of the brake bias in the vehicle.

According to a further aspect of the present invention, there is provided a kitset of parts for providing a brake bias adjustment system, the kitset including:
an adjustment device as described herein, and
a shaft.

In a preferred embodiment, the mounting may facilitate the adjustment device being attached to a vehicle e.g. by facilitating attaching the adjustment device to a surface in the vehicle. This feature allows the adjustment device to be positioned and secured in a location in which it can be used to adjust the brake bias of the vehicle. In addition, provision of a mounting may be particularly advantageous where the attachment portion is configured to attach to a non-rigid component, such as a flexible shaft.

In a preferred embodiment, the mounting may comprise pre-formed apertures to facilitate mounting the adjustment device to a surface.

In a preferred embodiment, the electronic display may be a segmented LCD display. In an alternative embodiment the electronic display may comprise a liquid crystal display (LCD), memory-in-pixel display (MIP), light emitting diodes (LED), electronic ink (E-ink) or any other display technology known to those skilled in the art.

In a preferred embodiment, the electronic display may display an indication of a current setting of a vehicle's brake bias. This indication may be displayed as a count of the number of turns or partial turns of the adjustment mechanism from a preferred zero set position. For example, a number shown on the electronic display may increment or decrement once for each 90 degree turn of the adjustment mechanism.

In particularly preferred embodiments, partial turns of the adjustment mechanism that are displayed on the display may correspond to the feedback mechanism (as is discussed in more detail below).

In a preferred embodiment, the adjustment device may be configured to display the brake bias setting in at least two different measurement units. For example, the brake bias setting may be shown as a ratio, a percentage of brake bias, a count of the detent positions passed, a physical measurement of length, etc.

In an alternative embodiment the electronic display may use an alternative scale or representation to show the current brake bias setting e.g. a bar graph.

In a preferred embodiment, the electronic display may include a lighting source. The lighting source may be advantageous as it may improve the visibility of the electronic display, particularly in low-light conditions.

Preferably this lighting source is backlighting. In alternative embodiments the lighting source may include edge-lighting or front-lighting.

In a preferred embodiment, the orientation of the electronic display may be fixed relative to the mounting. Therefore, as the adjustment mechanism moves, the position and/or location of the display remains substantially constant. This may be advantageous as the position and/or orientation of the electronic display will remain constant in use, despite the position and/or orientation of the adjustment mechanism.

However, this should not be seen as limiting. For instance, in alternative embodiments the electronic display may be movable with respect to the mounting. For instance, the adjustment device may include an articulation mechanism which facilitate the orientation of the display to be adjusted relative to the mounting.

The articulation mechanism may be any suitable arrangement e.g. at least one hinge or joint such as a ball and socket joint, or include other components such as an arm which is moveably connected to the mounting.

In a preferred embodiment, the electronic display may be located within the adjustment mechanism. This may allow the size of the adjustment device to be reduced.

In a preferred embodiment, the adjustment mechanism may comprise an inner housing and an outer housing. It may be advantageous to separate these components such that rotation of the outer housing does not cause rotation of the inner housing.

In a preferred embodiment, the electronic display may be positioned within the inner housing. Positioning the electronic display within the inner housing may allow the adjustment device to be small and compact. This may reduce the space which the device occupies in a vehicle and thereby provides a more compact device.

It is also envisaged that the front of the electronic display may protrude beyond at least one of an upper edge of the inner housing and the outer housing. In these embodiments, the width and length of the electronic display is within the inner housing, but the height of the electronic display is above at least one of the inner housing and outer housing.

In a preferred embodiment, the electronic display may be aligned with a window in the inner housing. This window may simply be an opening in the inner housing, or alternatively the device may include a transparent or semi-transparent material to protect the electronic display from being damaged in use.

In a preferred embodiment, the outer housing may be rotatably connected to the mounting portion. This may allow the mounting portion to be fixed to an interior of a vehicle, while allowing the outer housing to be rotated by a person in use.

In a preferred embodiment, the outer housing may be coupled to the attachment portion. This facilitates rotation of the outer housing causing the attachment portion to also rotate and thereby to adjust the brake bias of a vehicle. This feature of the present invention should become clearer from the following discussion of the present invention.

In a preferred embodiment, the rate at which the outer housing rotates relative to the attachment portion may be predefined. For example, the outer housing may have a 1:1 rotation with the attachment portion so that rotation of the outer housing through 360 degrees causes the attachment portion to also rotate through 360 degrees.

In an alternative embodiment, the predefined rate of rotation may be different. It may be advantageous to vary the relationship between the outer housing rotation and attachment portion rotation. For example, where fine control is desired, it may be advantageous to have multiple rotations of the outer hosing cause a single rotation of the attachment portion. Conversely, where rapid adjustment is desired, it may be beneficial fora single rotation of the outer housing to cause multiple rotations of the attachment portion. For example, a single rotation of the outer housing may be configured to cause two turns of the attachment portion.

In a preferred embodiment, the outer housing may comprise hand engagement portions. Preferably these hand engagement portions may be undulations in an outer surface of the outer housing. The provision of hand engagement portions may help to ensure that a person's hand does not slip off the adjustment mechanism in use. In addition, forming the hand engagement portions into the outer housing could provide a simpler design for the adjustment device.

In an alternative embodiment, the hand engagement portion may comprise a smooth, textured, or resiliently deformable surface coating. Furthermore, the hand engagement portions may be indentations or protrusions in the outer surface of the outer housing.

In a preferred embodiment, the adjustment device further comprises a sensing arrangement to detect rotation of the adjustment mechanism. For example, the sensing arrangement may comprise at least one source and at least one receiver. Preferably the source may be mounted on the outer housing and the receiver mounted on the inner housing. For example, the source may be a magnet and the receiver a device capable of detecting the magnetic field generated by the magnet, such as a hall-effect sensor. This arrangement facilitates detecting rotation of the outer housing with respect to and the inner housing.

However, the foregoing should not be seen as limiting on the scope of the invention. For instance, it is also envisaged that the source and the receiver may be mounted to different components, such as attaching the source to the mounting portion and the receiver to the adjustment mechanism, or vice versa.

In an alternative embodiment rotation of the adjustment mechanism is detected using other arrangements and detectors e.g. mechanical switches, encoders (rotary, capacitive, optical), proximity switches, etcetera.

In a preferred embodiment, the inner housing may be connected to the mounting portion through a series of gears. This configuration may advantageously allow the outer housing to rotate about the inner housing while ensuring that the inner housing remains in a fixed orientation.

In an alternative embodiment, the inner housing may be connected to the mounting portion by other arrangements and component e.g. magnets or screws.

In a preferred embodiment, the attachment portion may be configured to attach to another component. For example, the attachment portion may attach to a flexible shaft in a brake bias adjustment system. Connecting the attachment portion to another component allows the rotation of the adjustment mechanism to be transferred to the component.

In a particularly preferred embodiment, the attachment portion may comprise an output shaft that is structured and/or arrangement to facilitate connection to another component of a brake bias control mechanism in a vehicle.

For instance, the output shaft may include at least one aperture configured to receive a corresponding shaft such as a flexible shaft used in brake bias adjustment systems as would be known to one skilled in the art. The flexible shaft may be retained in the output shaft using a fastener such as a grub screw. Alternatively, the flexible shaft may be retained using an external adaptor, welding, adhesives, or a friction fit etcetera.

In a further alternative embodiment, the output shaft may have a unitary construction with the flexible shaft. This may remove the need to have a separate attachment portion which reduces part count, improves manufacturability and assembly of the device, and simplifies the installation process.

Configuring the attachment portion to attach to a shaft may allow the rotational movement of the adjustment mechanism to be transferred to the shaft such that an external mechanism, such as a brake bias control mechanism may be controlled.

In a preferred embodiment, the output shaft may be moulded integrally to the outer housing. This may advantageously provide a strong connection between the outer housing and the output shaft.

In an alternative embodiment, the output shaft may attach to the adjustment mechanism by another means such as by an adhesive, an interlocking keyed arrangement or a friction fit.

In an alternative embodiment, the output shaft may be operatively connected to the adjustment mechanism. For example, the output shaft may be connected to the adjustment mechanism by a gear mechanism. Use of a gear mechanism may allow the output shaft to rotate at a different rate to the adjustment mechanism, and therefore allow the adjustment of the brake bias output from the adjustment device to be optimised for a given rate of rotation of the adjustment mechanism.

In a preferred embodiment, the adjustment device may further comprise a feedback mechanism. This may be advantageous as it can facilitate the adjustment device providing feedback to a person on how the device is adjusted as they rotate the adjustment mechanism.

In a preferred embodiment, the feedback mechanism may provide tactile feedback to the person as they rotate the adjustment mechanism. For instance, the feedback mechanism may include structure and/or components that provide predefined rotational positions for the adjustment mechanism e.g. with respect to the mounting. These rotational positions provide an indication as to how far the adjustment mechanism may has been rotated in a given movement by a person without the person needing to see the display.

In a preferred embodiment, the adjustment device may include four predefined rotational positions. These positions may be evenly spaced 90 degrees apart.

In a preferred embodiment, the feedback mechanism may include a biasing member, and at least one interfering portion. For instance, the biasing member may be a spring while the interfering portion may be a ball bearing. In use, the ball bearing may engage with a series of detents such that rotation of the adjustment mechanism causes the interfering portion to rise and fall in and out of the detents to provide tactile and/or audible feedback to the user.

In an alternative embodiment, the feedback mechanism may be replaced or otherwise supplemented by a frictional element. Use of a frictional element may be advantageous to prevent inadvertent rotation of the adjustment mechanism due to vibration or other forces experienced by the adjustment mechanism in use.

In a yet further alternative embodiment, the adjustment device may not include a feedback mechanism or a frictional element.

In a preferred embodiment, the adjustment device may include a power source. The provision of a power source allows the adjustment device to be self-powered and there is no need to connect it to an external power source such as a vehicle's battery or alternator. In addition, this may allow the device to be a drop-in replacement for existing mechanical devices.

For instance, the power source may be a battery e.g. a 3V coin cell or other type of battery.

In an alternative embodiment, the adjustment device may be powered by an external power source e.g. the vehicle's battery or alternator.

In a preferred embodiment, the adjustment device may further comprise an interface. Including an interface may advantageously allow the user to configure settings, zero the electronic display, enable or disable the backlight or turn the device on and off.

More preferably the interface includes buttons. In an alternative embodiment this interface may include non-physical interface such as capacitive, resistive or inductive touch screens.

In a preferred embodiment, the control system further includes a balance bar rotationally connected to a pedal assembly. More preferably, the pedal assembly is configured such that rotation of the balance bar cause adjustment of the brake bias.

It should be clear from the foregoing discussion that the present invention may provide a number of advantages, including but not limited to being:

A compact adjustment device which is easy to install;
An adjustment device which is easy to read at a glance;
An adjustment device which is able to show how the brake bias has been set in a vehicle;
An adjustment device which can be reset or zeroed, allowing a user to change the reference point;
An adjustment device suitable for use in poor visibility e.g. low-light conditions;
An adjustment device which is able to be used as a drop-in replacement for purely mechanical adjustment devices;
An adjustment device capable of connecting to a wide range of external shafts and cables; and
An adjustment device wherein the output may be set to rotate at a predetermined rate compared to the user's input allowing rapid or precise control.

BRIEF DESCRIPTION OF THE DRAWINGS

One or more embodiments of the invention will be described below by way of example only, and without intending to be limiting, with reference to the following drawings, in which:

FIG. 1G shows an exploded perspective view of the components of the adjustment device of FIG. 1A;

FIG. 3A shows a perspective view of a system for adjusting the brake bias in a vehicle;

FIG. 6 shows a rear perspective view of an alternative attachment portion according to the present invention;

FIG. 13 shows a perspective view of the adjustment device of FIG. 12 having a display in a different orientation;

BEST MODES FOR CARRYING OUT THE INVENTION

Overview of the Invention

Figure 1A:
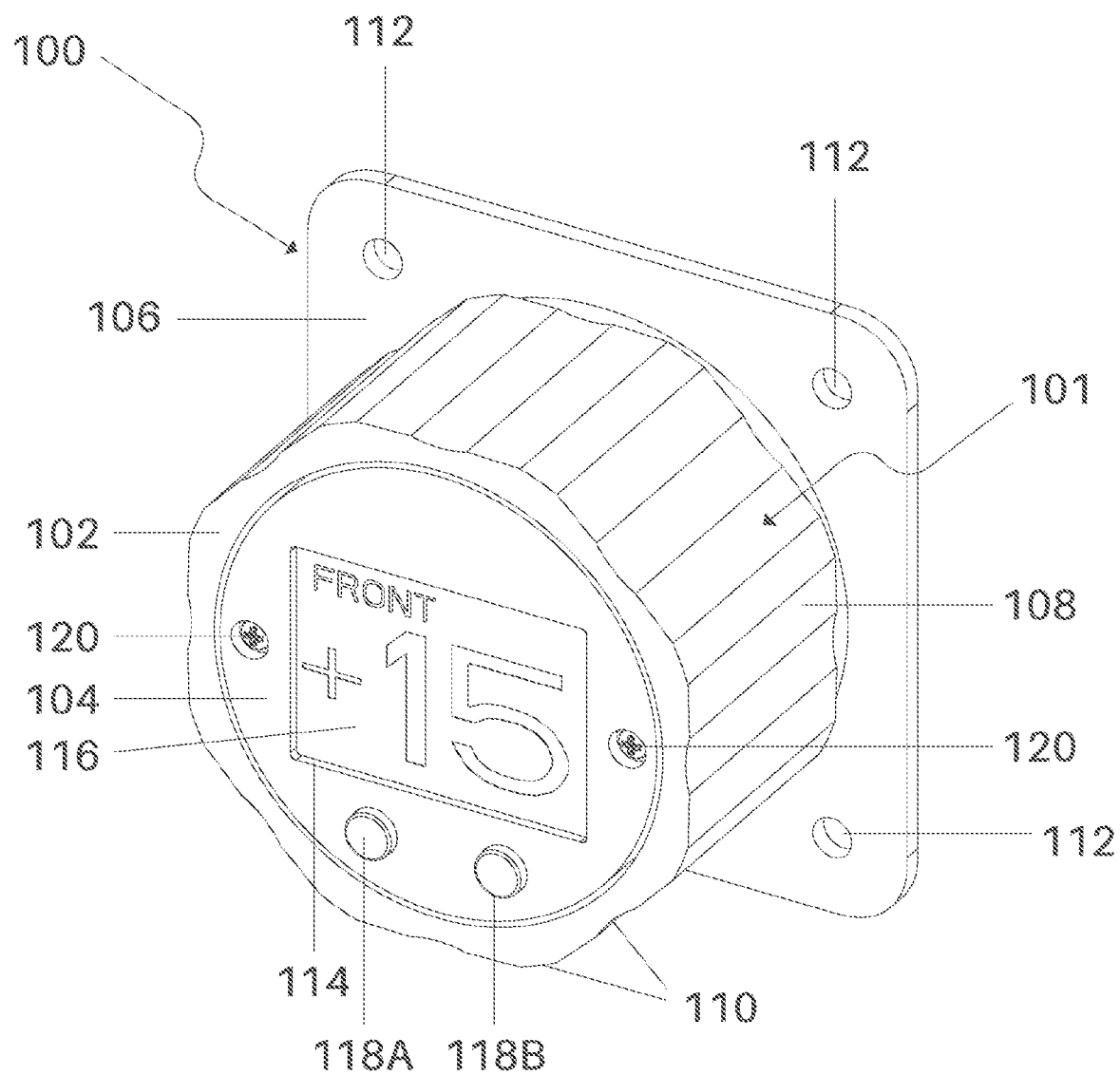
FIG. 1A shows a perspective view of a preferred embodiment of an adjustment device according to the present invention.

In one embodiment, the present invention provides an adjustment device (100) for use in a control system (300). The preferred control system (300) for this device is a system for adjusting the brake bias in a vehicle.

In general terms, the adjustment device (100) described herein has four main features:

A mounting portion (106), which facilitates attaching the adjustment device to a vehicle e.g. a surface such as the vehicle's dashboard;

An adjustment mechanism (101), which a user (not shown) can engage to provide mechanical movement to an attachment portion (122);

An attachment portion (122), which allows movement of the adjustment mechanism to be transferred to another component of the control system (300); and An electronic display (116) to provide feedback to the user as to the current setting of brake bias in the vehicle as adjusted or set by the control system.

The following discussion expands upon these features and the advantages they provide in reference to the embodiments shown in the drawings.

First Embodiment of an Adjustment Device

Referring first to FIGS. 1A to 1G which show an embodiment of an adjustment device (100) according to the present invention for use in a system to control the brake bias adjustment of a vehicle (as is discussed in more detail below).

The adjustment device (100) has an adjustment mechanism indicated generally as (101) in the Figures. In the embodiment of FIGS. 1A to 1G, the adjustment mechanism (101) is rotatably connected to a mounting portion (106).

The adjustment mechanism (101) shown in FIGS. 1A to 1G may otherwise be known as knob or dial. However, it should be understood that the adjustment mechanism (101) could be a lever or other component.

The mounting portion (106) is configured to facilitate attaching the adjustment device (100) in a vehicle as should become clearer from the discussion below.

The adjustment device (100) includes an electronic display indicated generally as (116) in the drawings. The electronic display (116) is fixed relative to the adjustment mechanism (101). Alternatively or additionally, the orientation of the electronic display (116) may be fixed relative to the orientation of the mounting portion (106).

The attachment portion (generally indicated by (122) in the drawings) is configured to transfer rotation of the adjustment mechanism (101) to another component of a control system (300) such as a flexible shaft.

Throughout the present specification, reference to the term "shaft" should be interpreted in a broad sense, including but not limited to a component which turns in order to transfer movement. This should be understood to include flexible shafts and rigid shafts. It should also be appreciated that the shaft may be a component of another object. For example, the shaft of a bolt, screw or potentiometer.

In the embodiment of FIGS. 1A to 1G, the adjustment mechanism (101) is provided by an outer housing (102) which is rotatably mounted to the mounting portion (106).

The outer housing (102) shown includes has a ridged outer surface (108) having a plurality of ridges (110), which facilitate a user gripping and rotating the outer housing (102). This may improve the ease of use of the adjustment device (100) and may reduce the likelihood that the user's hand will slip during use.

It should be understood however that the ridges (110) are optional and the outer surface (108) of may instead be substantially smooth, textured, or include indentations or protrusions. Alternatively, the outer housing (102) may be formed from, or coated with, a substance having a high coefficient of friction or adhesive to facilitate a user gripping the outer housing (102); for example, the outer housing (102) may be over-moulded with an elastomeric material such as rubber.

In addition, the outer housing (102) shown has a generally circular cross-section. Other shapes may be used without departing from the scope of the present invention. For example, the outer surface (108) of the outer housing (102) may be substantially triangular, rectangular, hexagonal or any other shape.

In an alternative embodiment, the outer housing may include a handle (not shown) or similar component that allows for relatively faster or easier rotation of the outer housing than were the handle not present. The handle may be fixed, rotatably or adjustably connected to the outer housing. For example, the handle may be constructed in a similar manner to a steering wheel spinner as should be known by those in the art.

The mounting portion (106) facilitates attaching the adjustment device (100) in a vehicle. This may be achieved by a series of apertures (112) in the mounting. The apertures (112) receive a fastener such as a screw, bolt, rivet, pin, clip or any other fastener known to one skilled in the art to secure the adjustment device (100) to a surface, such as a vehicle's dashboard.

The apertures (112) in the mounting portion (106) are provided by way of example only and should not be seen as limiting on the invention. For example, the adjustment device (100) may be mounted by any other means such as clamping, welding using an adhesive, studs or protrusions. Alternatively, apertures (112) may not be provided, but instead may be formed by an installer as required.

The adjustment device (100) includes an inner housing (104) and an electronic display (116) mounted in the inner housing (104). The orientation of the inner housing (104) and the electronic display (116) with respect to each other is fixed. In addition, the orientation of inner housing (104) and the electronic display (116) is fixed as the inner housing (104) and the electronic display (116) are non-rotatably fixed with respect to the mounting portion (106).

The inner housing (104) has a window (114) through which the electronic display (116) is visible. The window (114) may simply be an opening in the inner housing (104) or alternatively the window (114) may comprise a transparent or semi-transparent cover material which allows the electronic display (116) to be visible through the window (114).

In the embodiment illustrated in FIGS. 1A to 1G, the electronic display (116) is aligned with and is visible through an open window (114) in the inner housing (104).

The electronic display may comprise light emitting diodes (LEDs), a liquid-crystal display (LCD), electronic ink (E-ink) or any other type of display known to those skilled in the art. In the preferred embodiment the display is a segmented LCD. One benefit to using a segmented LCD over other display technologies such as organic LED (OLED) is a lower total power consumption which can extend the run-time of the device when on battery power.

Figure 1B:
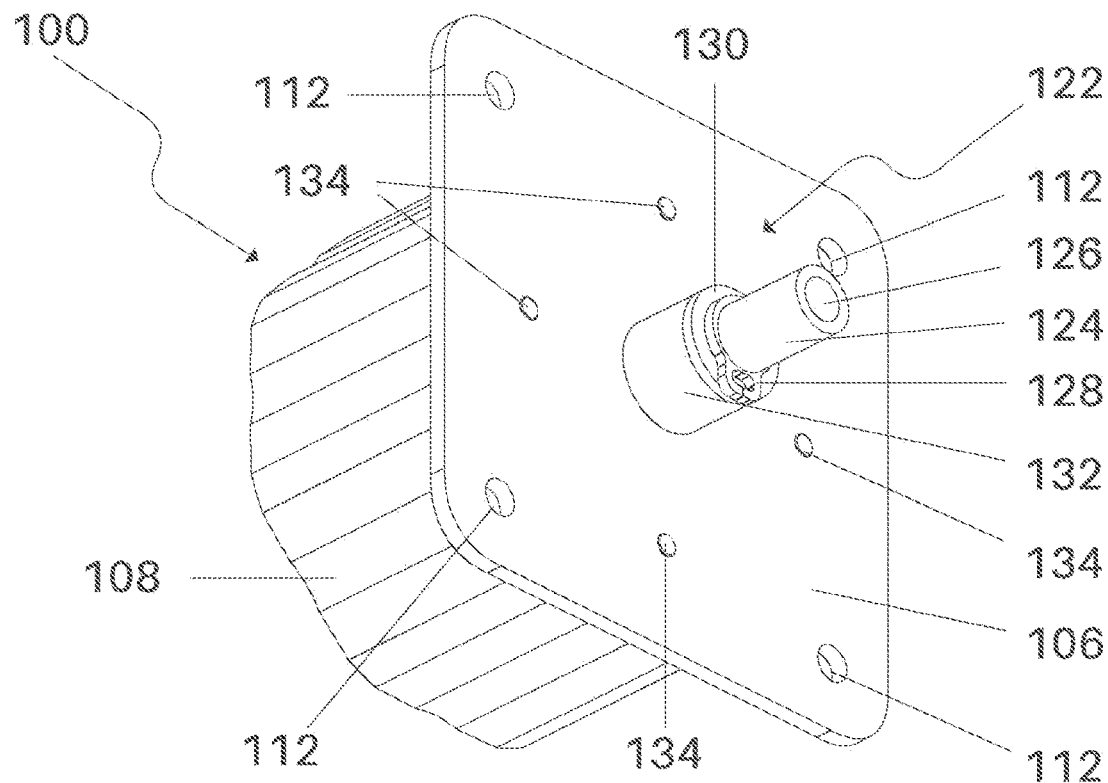
FIG. 1B shows a rear perspective view of the adjustment device of FIG. 1A.
Figure 1C:
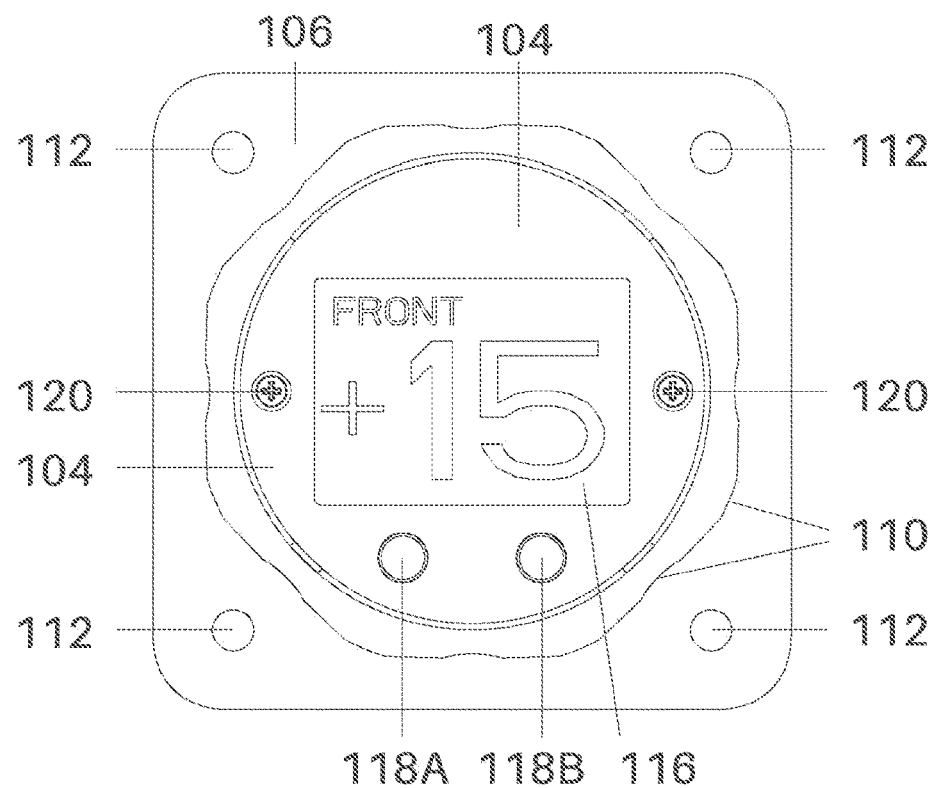
FIG. 1C shows a front view of the adjustment device of FIG. 1A.
Figure 1D:
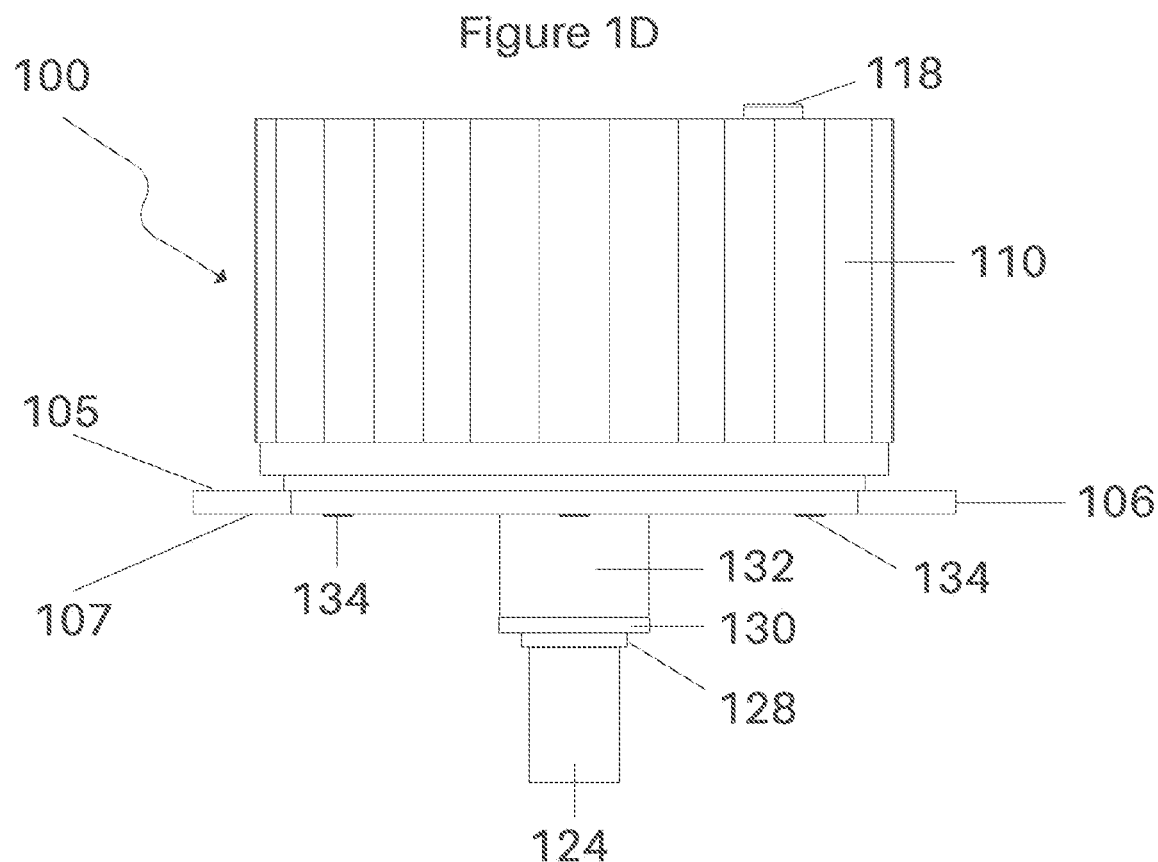
FIG. 1D shows a side view of the adjustment device of FIG. 1A.
Figure 1E:
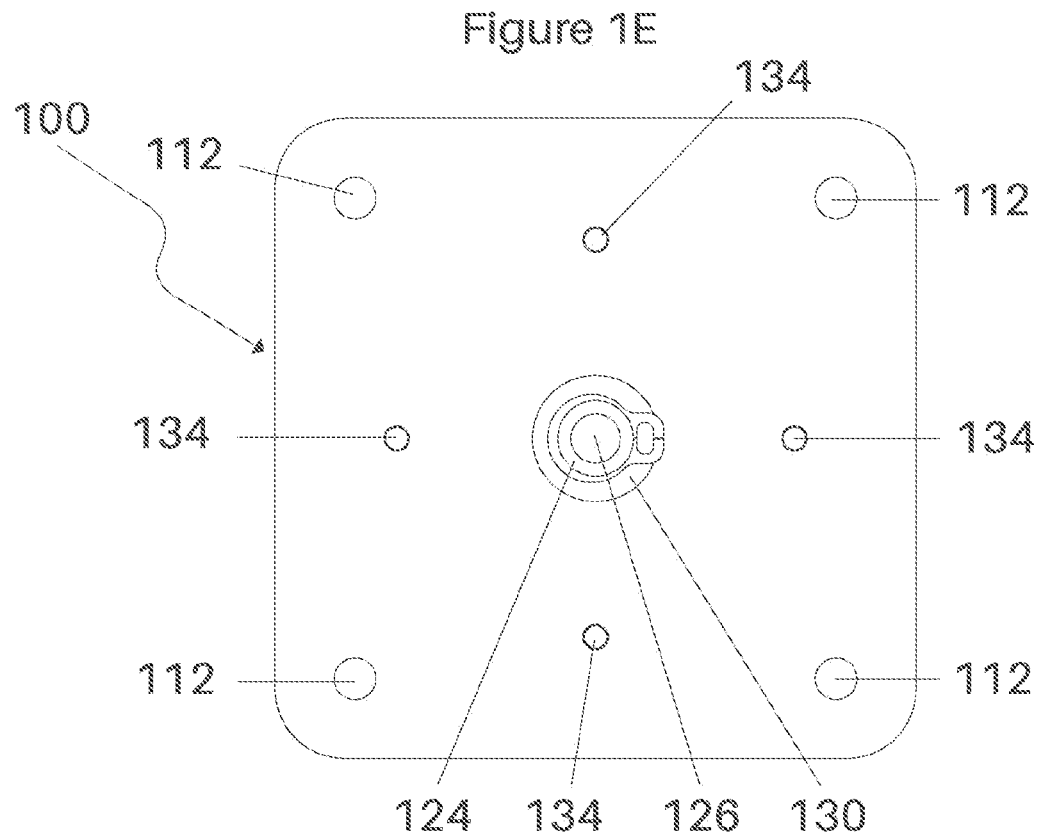
FIG. 1E shows a rear view of the adjustment device of FIG. 1A.
Figure 1F:
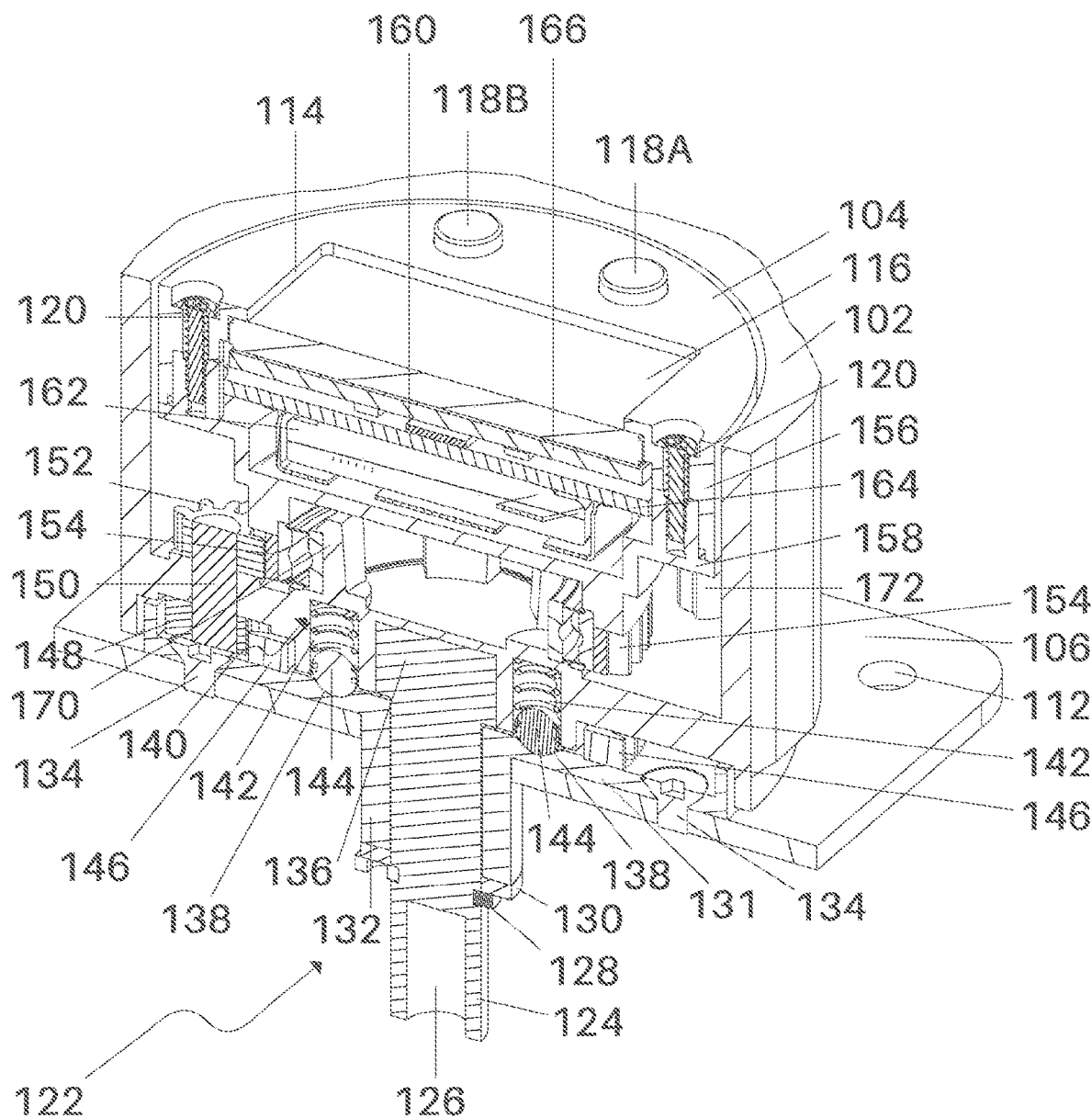
FIG. 1F shows a cross-sectional perspective view of the adjustment device of FIG. 1A, the cross-sectional view substantially cutting through the centre of the adjustment device in a plane which is parallel with the electronic display.

The adjustment device includes a power source, preferably in the form of a battery (162) as shown in FIGS. 1F and 1G. However, in alternative embodiments the adjustment device (100) may have an external power connection, such as to the vehicle's battery.

The electronic display (116) comprises a lighting source, preferably backlighting. Alternative lighting sources such as front lighting or edge lighting could also be used as known to those skilled in the art. Including a lighting source may help to improve the visibility of the electronic display (116), particularly in low-light conditions.

In an alternative embodiment of the invention, the electronic display (116) may not include a lighting source. This may provide a lower-cost or lower profile alternative.

The adjustment device (100) includes an interface indicated generally as (118). The interface (118) is operatively connected to electronics (160) which have been configured to allow control and/or configuration the adjustment device (100). Electronics (160) suitable for driving an electronic display (116) and providing a functional interface (118) will be known to those skilled in the art. For example, the electronics may comprise a micro-controller or micro-processor programmed to execute actions based on a user's input.

The interface (118) comprises at least one button such as the two buttons illustrated in FIG. 1A. In use the outer housing (102) may also be configured to work in conjunction with the interface (118) to send signals to the electronics (160) to control or configure the adjustment device (100). For example, the interface may be configured to provide functionality related to long or short presses of the buttons, pressing both buttons simultaneously and/or rotating the adjustment mechanism.

In one embodiment, a long press of one of the buttons (118A or 118B) is configured to power on the device. A further long press may switch the device into a low power mode or power off the device. It is advantageous for the device to be able to be switched into a low power mode which reduces current draw, as this would extend the useful life of the battery (162) e.g. when the device is not in use such as between races.

A short press of the same button (118A or 118B) may enable or disable the backlight. The second button (118A) is ideally configured to allow the number displayed on the electronic display to be zeroed. In doing so a user may set their preferred brake bias at the zero position, in order to easily adjust back to that position when required.

The interface (118) may also be used to configure the settings of the adjustment device. For example, pressing and holding both buttons (118A, 118B) may enter the device into a configuration mode. This configuration mode may be navigable by rotating the adjustment mechanism. Selecting options with one of the buttons (118A or 118B) and exiting menus using the other. Examples of settings that could be configured in this manner include:
- Whether clockwise rotation of the adjustment mechanism causes the displayed number to increment or decrement;
- Whether the electronic display displays rotation of the adjustment mechanism, a count of the number of "clicks" provided by the feedback mechanism, or a percentage of bias adjustment towards the front or rear wheels;
- How long the backlight remains on after the adjustment device has been used to adjust brake bias adjustment; or
- Whether the brake bias distribution is displayed as relative to the front brakes, or relative to the rear brakes.

The electronic display (116) is configured to display a numerical indication that increases or decreases as the outer housing (102) and/or adjustment device (101) is rotated. For example, the numerical indication may increment as the adjustment device (101) is rotated clockwise, or decrement as the adjustment device (101) is rotated anti-clockwise.

This numerical indication is related to the brake bias setting of a vehicle. The numerical indication may indicate the number of times the adjustment device has been rotated through a predefined number of degrees, or provide an indication of the brake bias setting such as a percentage, a ratio or an arbitrary scale.

The predefined number of degrees may be related to the tactile feedback positions described below. However, this should not be seen as limiting on the invention. In the embodiment shown in FIGS. 1A to 1G, the predefined number of degrees is substantially 90 degrees.

The illustrated interface (118) is provided by way of example only and it will be appreciated by those skilled in the art that the interface may comprise other configurations and/or components. For instance, the interface (118) could include at least one button, switch, lever, wheel, dial, touch pad, or combinations thereof. It should also be appreciated that the interface (118) may be provided separately to the adjustment device (100), such as over a wired or wireless connection.

The inner housing is formed by an upper portion (156) and a lower portion (158). As shown in FIG. 1F, fasteners (120) attach the upper portion (156) of the inner housing (104) to the lower portion (158) of the inner housing as will be discussed in more detail below.

As shown in FIG. 1B, the adjustment device (100) includes an attachment portion (122) provided on the rear of the adjustment device (100).

The output shaft (124) is provided with a connection aperture (126) configured to receive or otherwise attach to an external component such as another shaft or a flexible shaft (not shown in FIG. 1B). By attaching the output shaft (124) to an external member such as a flexible shaft (not shown in FIG. 1B), rotation of the outer housing (102) can be transferred through the output shaft (124) to the flexible shaft (not shown in FIG. 1B).

The attachment portion (122) is retained within the collar (132) and mounting portion (106) using a retention mechanism (128). FIG. 1B shows an embodiment of a suitable retention mechanism (128) in the form of an external circlip, a spacer (130) in the form of a bushing and a collar (132). The purpose of these components should become clear from the foregoing discussion.

A series of fasteners (134) can be seen on the rear of the mounting portion (106). These fasteners attach the flange of the collar (132) to the mounting portion (106) so that rotation of the output shaft (124) does not cause rotation of the collar (132).

In the embodiment shown, the adjustment device (101), and electronic display (116), are positioned on a first side (105) of the mounting portion (106), and the attachment portion (122) is positioned on a second side (107) of the mounting portion (106). This may make the adjustment device (100) easier to install, as these components would not need to be passed through an aperture to mount the adjustment device (100) to a surface.

Referring now to FIG. 1F which shows a cross sectional view of the adjustment device (100). From this view it can be seen how the various components of the invention assemble together and in use interact.

In particular it can be seen that the output shaft (124) comprises a head (136) which is attached to the outer housing (102). In the preferred embodiment the outer housing (102) is over-moulded onto the output shaft (124). It will be appreciated however that other methods of attaching the output shaft (124) to the outer housing (102) include using adhesives, welding, friction-fit, or a keyed arrangement. It will also be understood that the output shaft (124) may have a unitary construction with the outer housing; for example, the output shaft (124) and outer housing (102) may be moulded from the same material e.g. polycarbonate.

Therefore, in the embodiment shown, rotation of the outer housing (102) causes 1:1 rotation of the output shaft (124).

In alternative embodiments the output shaft (124) is not directly connected to the outer housing (102), rather it is operatively connected through an intermediate means such as gears, in this way rotation of the outer housing may cause rotation of the output shaft, or rotation of the output shaft which occurs at a different speed to the outer housing. For example, the outer housing (102) may comprise a ring gear, as is common with a planetary gearbox. This ring gear may mesh with a planetary gear which in turn provides rotation to a central gear connected to the shaft. This arrangement will be understood by those familiar with planetary gearboxes.

Referring back to FIG. 1F, as shown, the output shaft (124) extends through the collar (132). The output shaft (124) is prevented from falling through the collar (132), due to the combined output shaft (124)/outer housing (102) being too large to fit through the collar (132). In embodiments where the output shaft (124) is removably attached to the outer housing (102) the head (136) of the output shaft or a suitable friction device such as a grub screw or nut may provide a similar function.

Once the output shaft (124) has been inserted through the collar (132), a spacer (130) and retention mechanism (128) is used to prevent the output shaft (124) from being removed from the collar.

Fasteners (134) in the form of machine screws attach the flange (131) of the collar (132) to the mounting portion (106) so that the collar remains fixed relative to the mounting.

Feedback Mechanism of the First Embodiment

The collar includes a series of detents (138) which interact with a tactile feedback mechanism (140). In the embodiment shown the tactile feedback mechanism comprises a biasing member (142) in the form of a spring, and an interfering portion (144) in the form of a ball bearing. However, it will be appreciated that alternative methods of providing tactile feedback may be used; for example, using a ratchet type clicker assembly as known to those skilled in the art.

The biasing members (142) force the interfering portions (144) into the detents (138). This provides a degree of resistance to the rotation of the outer housing (102) which helps to prevent unintended rotation, either by vibration, or from forces imparted to the output shaft (124).

As the outer housing (102) is rotated relative to the mounting portion (106) and collar (132). The interfering portions (144) are forced out of the detents (138). Continued rotation of the outer housing (102) causes the interfering portions to re-align with the detents (138) in the collar (132). As this occurs, the interfering portions (144) "click" or "snap" into place in the detents (138) which provides the user with a measure of tactile and/or audible feedback.

This feedback can be valuable for the user as they can keep track of the position of the outer housing (102) without needing to look at the adjustment device (100). For example, when used for brake bias adjustment, the user can adjust the dial a certain number of "clicks" in one direction as they approach a corner, and as they exit the corner they can return the brake bias to the previous setting by adjusting the dial back the same number of clicks.

In the embodiment shown, there are two tactile feedback mechanisms (140), which engage with four detents (138) which are evenly spaced in the collar (132). In this way, tactile feedback is produced for every 90 degrees the outer housing (102) is rotated. This is however, in no way limiting on the invention, and it will be understood that the invention would work with any number of tactile feedback mechanisms (140) and detents (138). For example, the system could include a single tactile feedback mechanism (140) which engages with eight evenly spaced detents (138). In this example tactile feedback would be produced for every 45 degrees the outer housing (102) is rotated.

First Embodiment of an Arrangement to Prevent Rotation of the Electronic Display One key advantage of the present embodiment is that, as the outer housing (102) is rotated, the inner housing (104) remains in a fixed location relative to the mounting portion (106). In this way the electronic display (116) remains in a fixed, upright orientation for the driver. To achieve this a series of gears are used.

In the embodiment shown a first gear (146) is fixed to the collar (132). This gear engages with a second gear (148) (often referred to as a planetary gear). This second gear (148) is rotatably connected to the outer housing (102), such that, as the outer housing is rotated, the teeth of the first (fixed) gear (146) mesh with the teeth of the second gear (148) causing rotation of the second gear (148).

The rotation of the second gear (148) is transferred through an axle (150) to a third gear (152). In this way the second gear (148) and third gear (152) form a compound gear. The third gear (152) in turn meshes with a fourth gear (154) which is attached to the inner housing (104). In the embodiment shown, the first gear (146), and fourth gear (154) have the same number of teeth, and the second gear (148) and third gear (152) have the same of teeth. As such the fourth gear (154) must rotate at the same speed as the first gear (146), which is to say not at all.

It is desirable for the inner housing (104) remain fixed relative to the mounting portion (106) so that the electronic display (116) remains in an upright orientation.

In the embodiment illustrated in FIGS. 1F and 1G, the first gear (146) and the fourth gear (154) each have 48 teeth, and the second gear (148) and the third gear (152) have 11 teeth. However, it will be understood that each of the gears may have a different number of teeth while still achieving the same result, providing that the gear ratio between the first (146) and second (148) gears matches the gear ratio between the third (152) and fourth gears (154). This may be particularly advantageous where the sizes of the respective gears are different, for example due to space constraints.

In an alternative application it may be desirable for the inner housing (104) to rotate relative to the mounting portion (106) as the outer housing (102) is rotated. In this situation the relative rotation of the inner housing (104) to the outer housing (102) can be set by providing alternative gear ratios.

The inner housing (104) shown, is split into two distinct parts, an upper portion (156) and a lower portion (158). These two parts are connected by the fasteners (120) previously discussed. The upper portion (156) effectively provides a top cap to house the electronic display (116), backlighting (166), electronics (160) and battery (162) (where battery power is used).

In the embodiment shown, the electronics are provided on a printed circuit board (PCB) (164). This PCB controls the electronic display (116) and interface (118) for the user interface.

To replace the battery (162) the user can simply remove the fasteners (120), remove the upper portion (156), then lift out the PCB (164) with associated electronic display (116), backlighting (166) and battery (162). The battery (162) can then be replaced and the inner housing (104) reassembled in the reverse order.

The lower portion (158) of the inner housing (104) interfaces with the geared arrangement described above to ensure that the inner housing (104) remains fixed relative to the mounting portion (106). In the embodiment shown, the inner housing (104) is attached to the fourth gear (154) so that rotation of the fourth gear (154) causes rotation of the inner housing (104).

In the embodiment shown, the inner housing is rotatably connected to the outer housing by way of a bearing (168). This bearing (168) is attached to the outer housing (102) by a series of clips (170). It should be appreciated that alternative methods of rotatably connecting the inner housing (104) to the outer housing (102) may be used without departing from the scope of the present invention. For example, the use of a bearing (168) is optional and instead the inner housing (104) may clip or otherwise attach to the outer housing (102) such that the material of the inner housing (104) slides against the material of the outer housing (102).

One key feature of the present invention is that the rotation of the adjustment mechanism (101) of the adjustment device (100) is monitored and the electronic display (116) is updated accordingly. There are a number of ways to achieve this, but in the preferred embodiment shown in FIGS. 1F and 1G, a sensing arrangement (171) is provided. This sensing arrangement (171) comprises supports (172) positioned within the outer housing (102) for holding a source in the form of magnets (174). As the outer housing (102) rotates relative to the inner housing (104) receivers in the form of hall-effect sensor(s) (175) connected to or mounted on the PCB (164) detect the position of these magnets as the outer housing (102) is rotated.

The magnets (174) may be positioned above, below or at the same height of the PCB, and similarly the location of the hall-effect sensor(s) (175) may be aligned accordingly.

It may be advantageous to include the sensing arrangement (171) on a first side (105) of the mounting portion (106) as the electronic display (116) and/or the adjustment mechanism (101). For instance, doing so may reduce the amount of space needed to mount the adjustment device (100), and/or reduce the size of the aperture required for mounting the adjustment device (100).

Similarly, it may be advantageous to provide the attachment portion (122) on a second side (107) of the mounting portion (106), such that only a relatively small amount of the adjustment device (100) needs to be passed through an aperture in a mounting surface to mount the adjustment device (100).

This detection method however, should not be seen as limiting on the invention, and other methods will be known to those skilled in the art, such as the use of mechanical switches, encoders (rotary, capacitive, optical), proximity switches, etcetera.

First Embodiment of a Method of Attaching an External Member

Figure 2A:
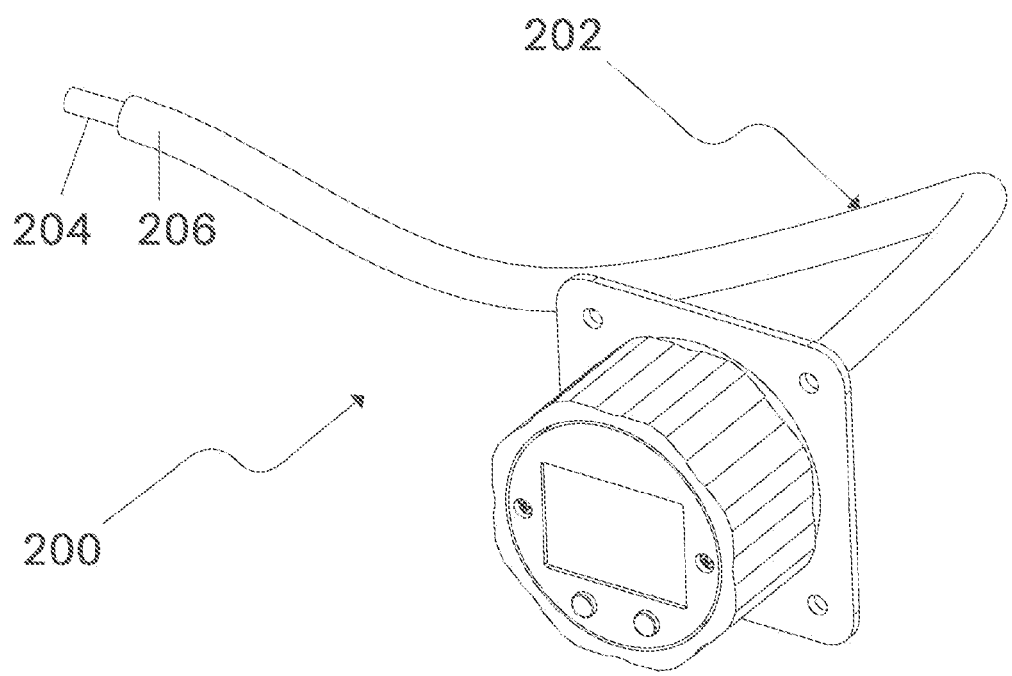
FIG. 2A shows a perspective view of an adjustment device attached to an external member in the form of a flexible shaft.
Figure 2B:
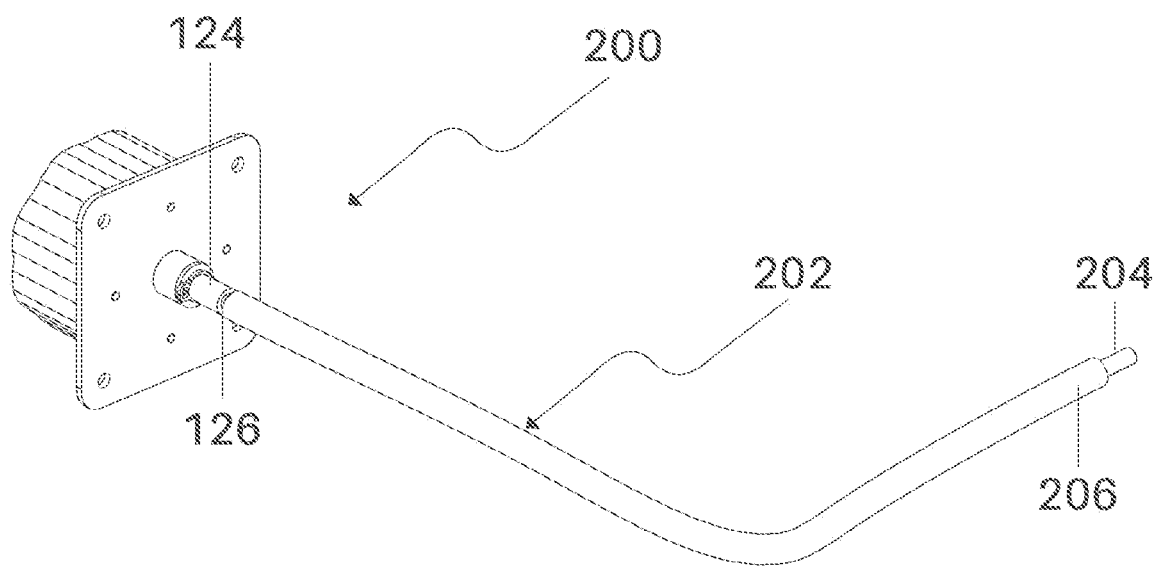
FIG. 2B shows a rear perspective view of the adjustment device of FIG. 2A.

Referring now to FIGS. 2A and 2B which show an adjustment device (200) connected to an external member (202) in the form of a flexible shaft. Flexible shafts are known to those skilled in the art and as such we do not expand upon these here. In addition, the use of a flexible shaft is exemplary only and the adjustment device (200) may instead provide rotation of another member such as a rigid shaft, screw, bolt, nut, potentiometer, or any other such device.

The flexible shaft (202) shown, comprises a rotational portion (204) and an outer sheath (206). The rotational portion (204) being received by the connection aperture (126) in the output shaft (124). This rotational portion (204) may be retained in the connection aperture (126) by any suitable means such as, grub screws, adhesives, an interference fit, clamping. Examples of suitable attachment mechanisms are described in further detail later in the specification.

It should also be understood that the adjustment device (200) of the present invention may be provided as part of a kitset of parts for the adjustment of braking bias in a vehicle.

First Embodiment of a Pedal Assembly

Referring now to FIGS. 3A to 3F which illustrate a system (300) for adjusting the brake bias in a vehicle, using the adjustment device (302) described herein.

FIG. 3A shows a pedal box or pedal assembly as should be known to those skilled in the art. This pedal assembly comprises a clutch (304) and brake pedal (306) that are commonly found in manual transmission vehicles. Note that the present invention is suitable for use in vehicles with an automatic transmission and the presence of the clutch is shown for context only. Furthermore, the accelerator is not shown in this view for clarity.

Overview of Vehicle Braking Systems

In broad terms, braking systems comprise master cylinders which convert mechanical pressure (pressure applied to the brake pedal) to hydraulic pressure. This hydraulic pressure in turn operates slave cylinders inside the vehicle's brakes (callipers or drum brakes).

Referring back to FIGS. 3A and 3B it can be seen that as pressure is applied to the brake pedal (306) it pivots about its attachment point (308). This movement is transferred through a balance bar (310), into a pair of push rods (312), which in turn drive pistons in a first master cylinder (314) and a second master cylinder (316).

The push rods compress the hydraulic fluid inside each of the master cylinders (314, 316). Each master cylinder then transfers this hydraulic pressure through hydraulic hoses (not shown) to slave cylinders (not shown) in each of the vehicles brakes (not shown).

The first master cylinder (314) may be hydraulically connected to either the front or rear brakes of the vehicle. Similarly, the second master cylinder (316) will connect be hydraulically connected to the remaining set of brakes. That said, it is common for the master cylinder that is connected to the front wheels to be larger than the one connected to the rear wheels.

Figure 3B:
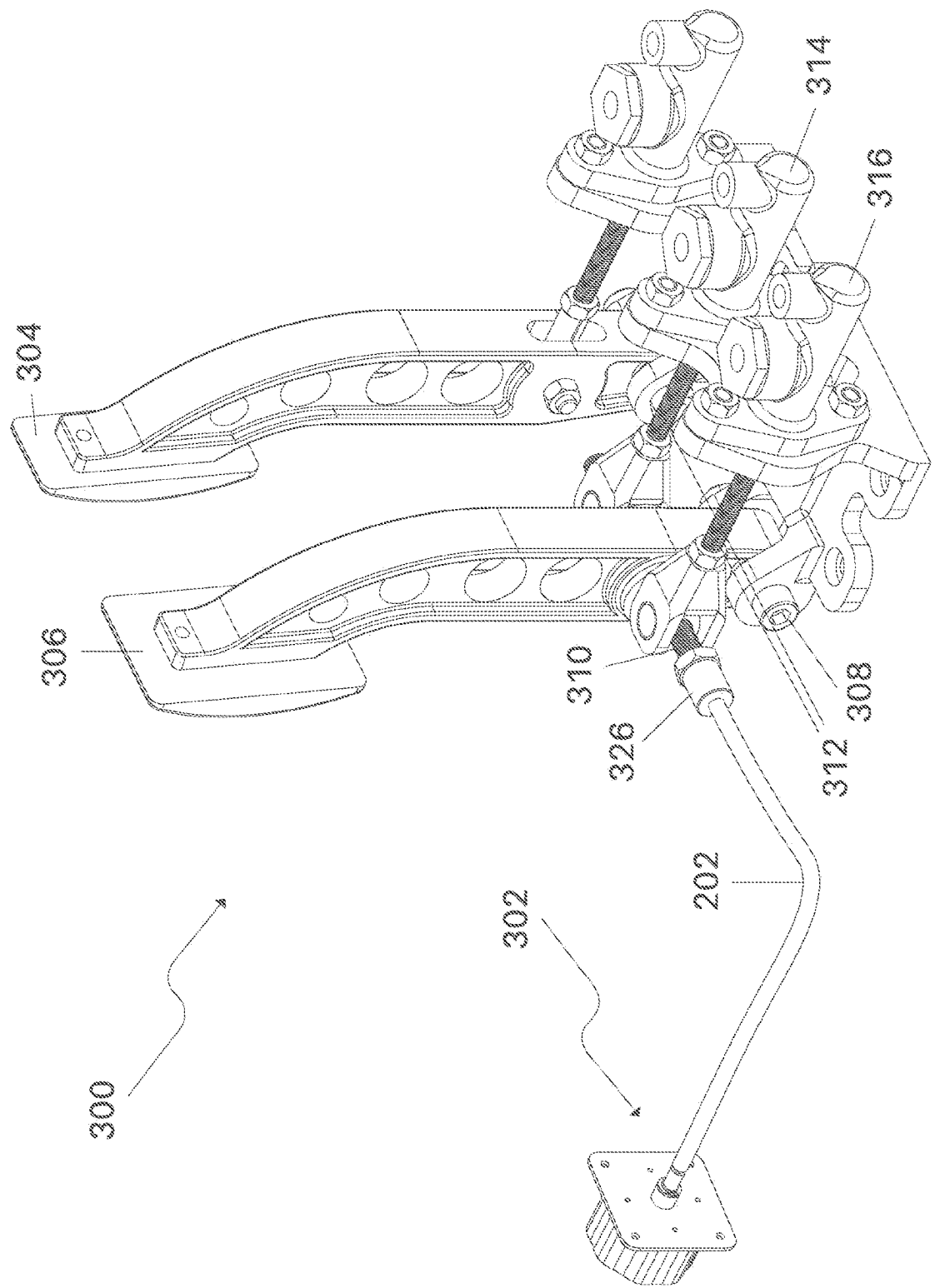
FIG. 3B shows a rear perspective view of the system of FIG. 3A.
Figure 3C:
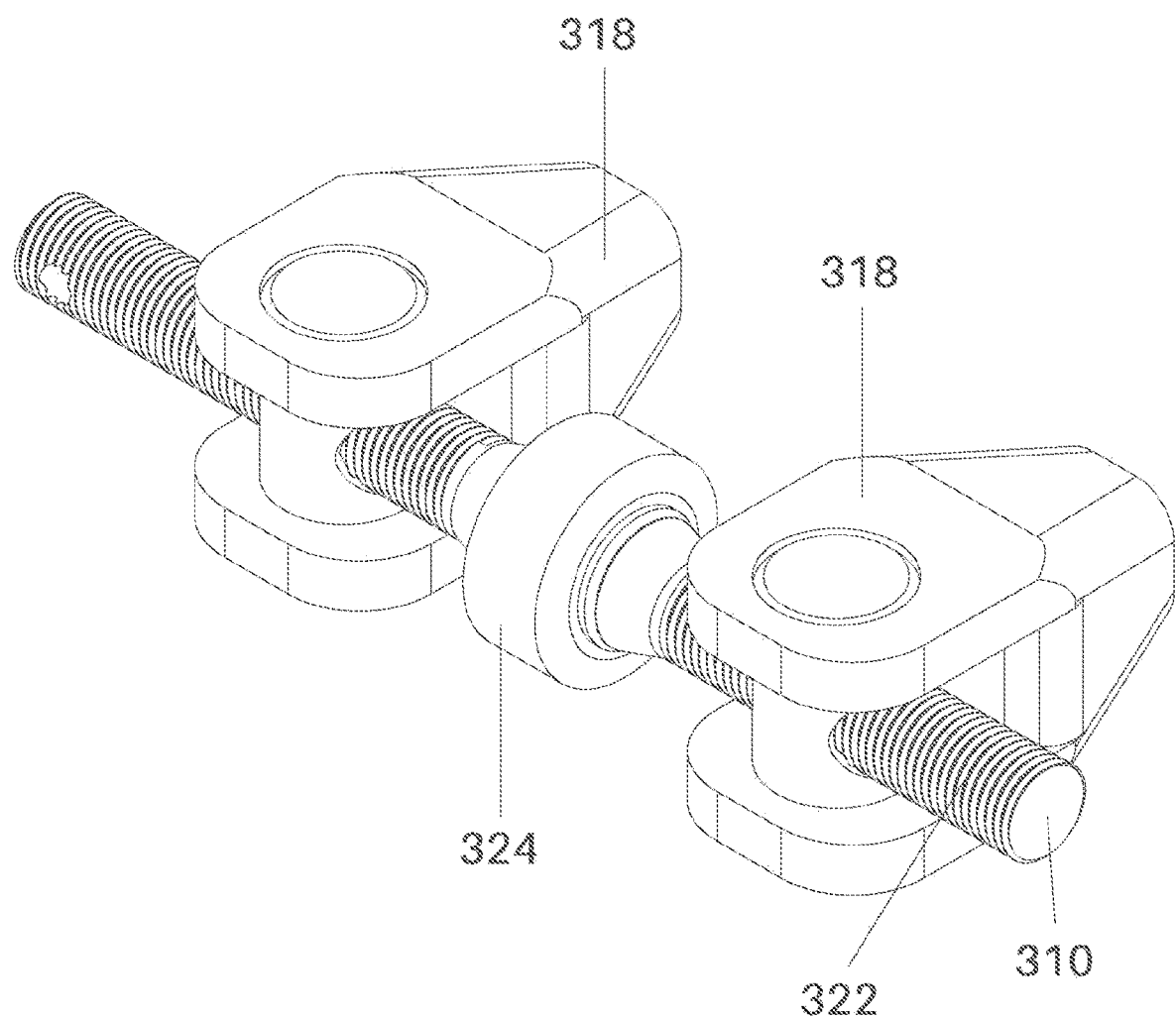
FIG. 3C shows a close-up perspective view of components of the system of FIG. 3A.
Figure 3D:
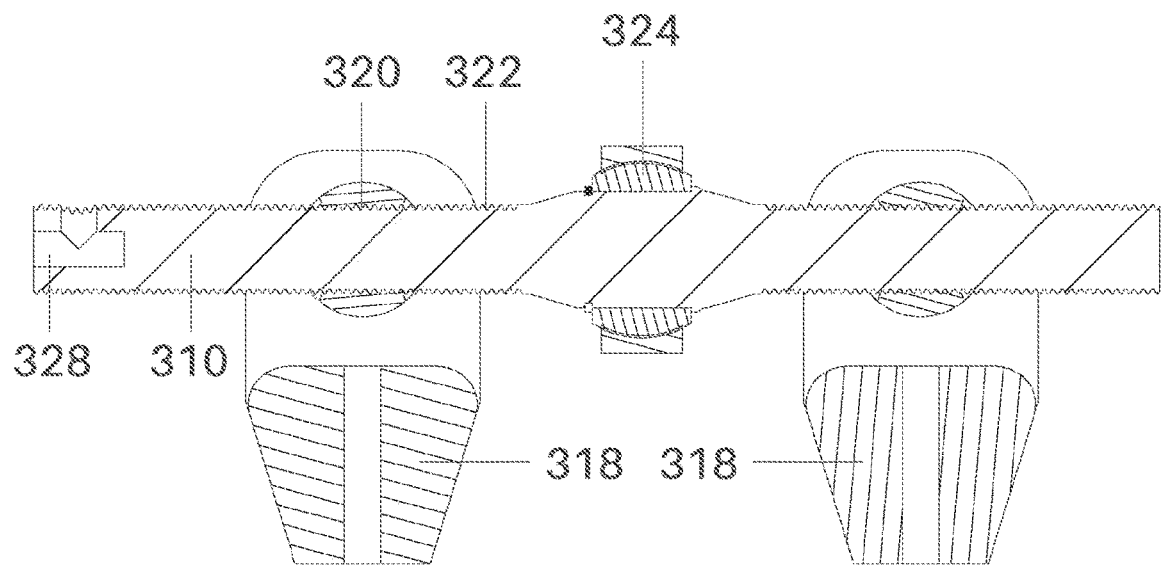
FIG. 3D shows a cross-sectional view of the components of FIG. 3C in a first position, the cross-section running through the centre of the balance bar in a parallel axis to the devises.
Figure 3E:
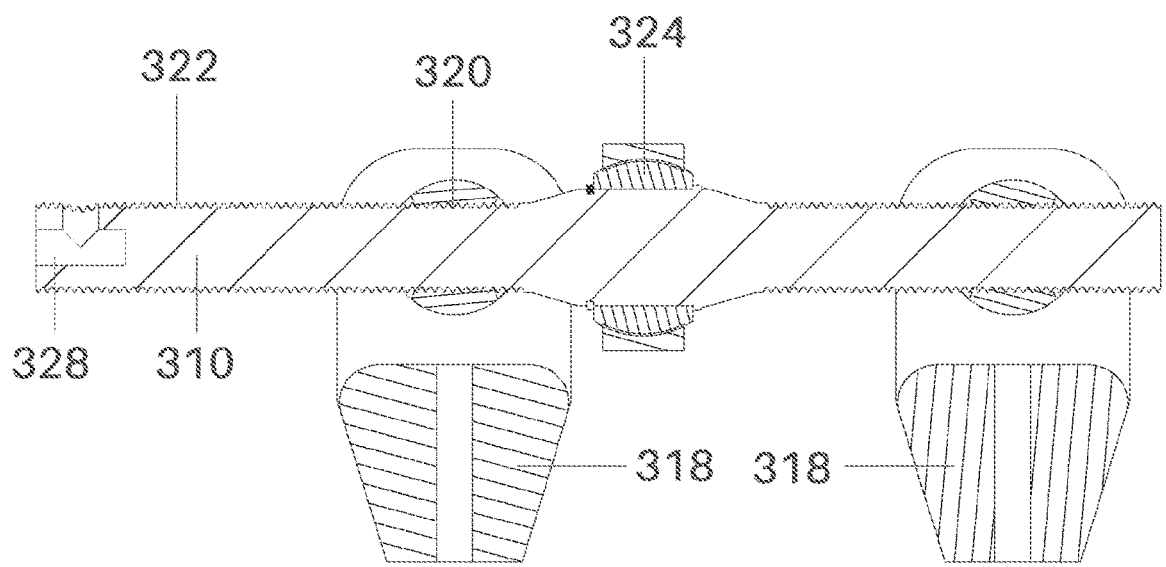
FIG. 3E shows a cross-sectional view of the components of FIG. 3C in a second position, the cross-section running through the centre of the balance bar in a parallel axis to the devises.

Referring to FIG. 3C we can see that the balance bar (310) attaches to each of the push rods (312) using clevises (318). As shown in FIGS. 3D and 3E, each of these clevises have internal threads (320) that engage with the external thread (322) on the balance bar (310).

Also provided on the balance bar (310) is a spherical bearing (324). In use the brake pedal (306) acts upon the spherical bearing (324) to transfer the mechanical force of the user pressing the brake pedal to the balance bar. Use of a spherical bearing (324) allows the balance bar to be positioned at an angle (other than 90 degrees) relative to the brake pedal.

First Embodiment of a Control System for Adjusting Brake Bias

Referring now to FIGS. 3D and 3E, it can be seen that rotation of the balance bar (310) causes the balance bar to move within the clevises (318). In this way the relative position of the spherical bearing to the clevises may be adjusted.

As any force applied to the brake pedal (306) is transferred to the spherical bearing (324), the position of the spherical bearing (324) relative to each of the clevises (318) determines the ratio of force applied to each of the push rods (312).

For example, in FIG. 3D the spherical bearing (324) is positioned in a central or neutral position. While, FIG. 3E shows the spherical bearing (324) in a second position which is biased towards one of the clevises (318).

The amount of hydraulic force applied to each of the sets of brakes therefore depends on:

The amount of force applied to the brake pedal;

The size each of the master cylinders; and

The relative positioning of the spherical bearing to each of the push rods.

To simplify the foregoing explanation, the following discussion assumes that the first master cylinder (314) is hydraulically connected to the front brakes of the vehicle, and the second master cylinder (316) is connected to the rear brakes of the vehicle.

By rotating the balance bar (310) the spherical bearing (324) may be moved towards the push rod (312) that connects to the first master cylinder (314). Therefore, when the user applies force to the brake pedal (306) a greater percentage of this force is transferred to the first master cylinder (314) increasing the brake force applied to the front brakes.

One key advantages of the adjustment device (302) of the present invention is that it allows for adjustment of the brake bias of a vehicle from within the driver's seat of the vehicle. Furthermore, it allows for real-time adjustment by the driver while racing.

To achieve this the flexible shaft (202) may be attached to the balance bar (310) so that rotation of the adjustment device (302) causes rotation of the balance bar (310). Attachment of the flexible shaft (202) to the balance bar (310) may be achieved in a number of ways. For example, the flexible shaft may be provided with an adapter (326) that engages the external thread of the balance bar as shown in FIGS. 3A and 3B. Alternatively, the flexible shaft (202) may be received within an aperture (328) in the balance bar (310) and secured in place using a fastener such a grub screw as shown in FIGS. 3D and 3E. Of course, there are other ways of achieving this connection which will be known to those skilled in the art. For example, the flexible shaft (202) may attach to the balance bar using clamping, adhesives, welding, friction fit, etcetera.

Figure 3F:
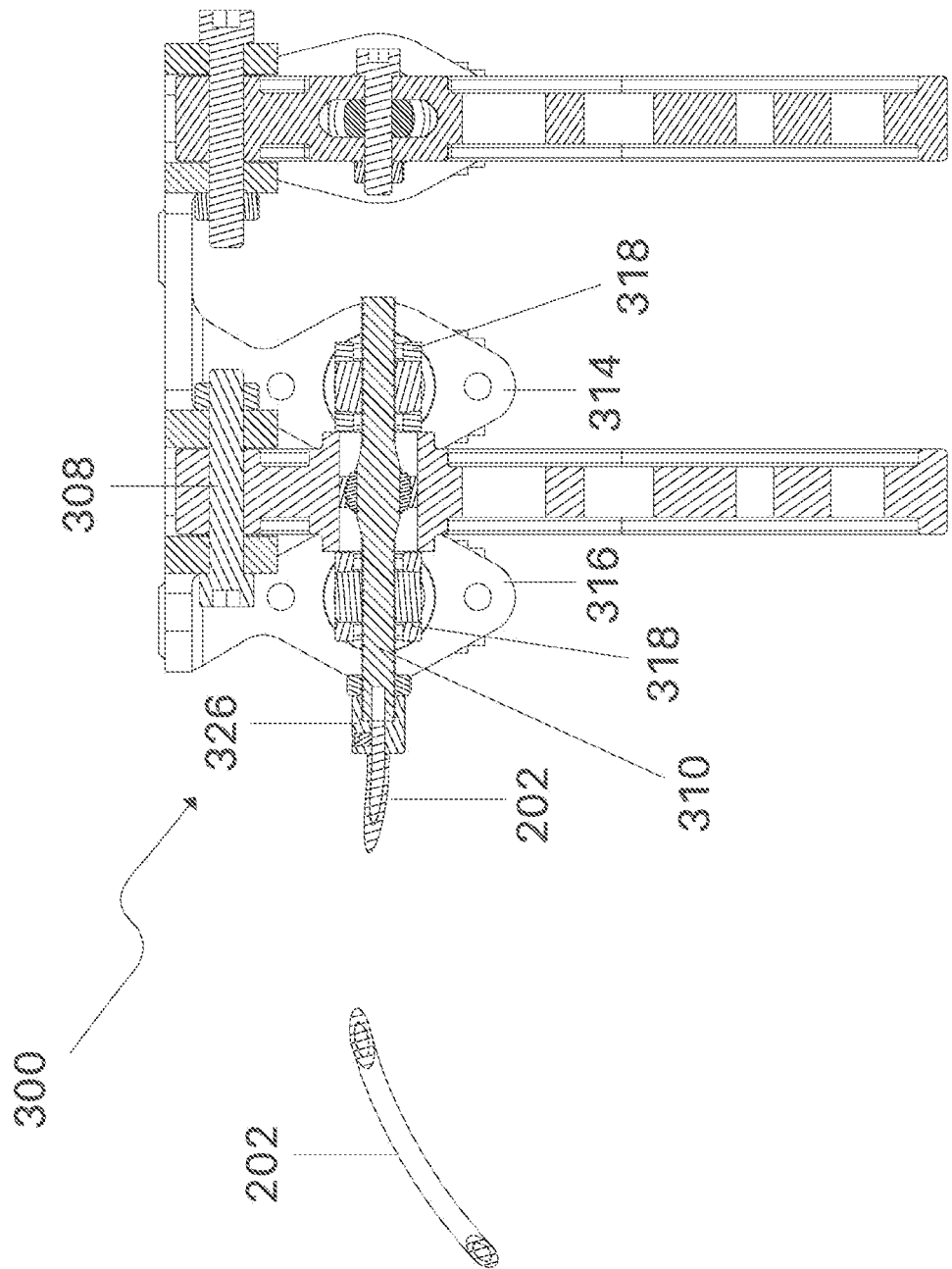
FIG. 3F shows a cross-sectional view of the system of FIG. 3A, the cross-section running through the centre of the balance bar in a perpendicular axis to the devises.

Referring now to FIG. 3F which shows a cross sectional view of the brake bias adjustment system (300). In this view, further details of an exemplary adapter (326) for attaching the flexible shaft (202) to the balance bar (310) can be seen.

Alternate Mounting of the Electronic Display

Figure 4A:
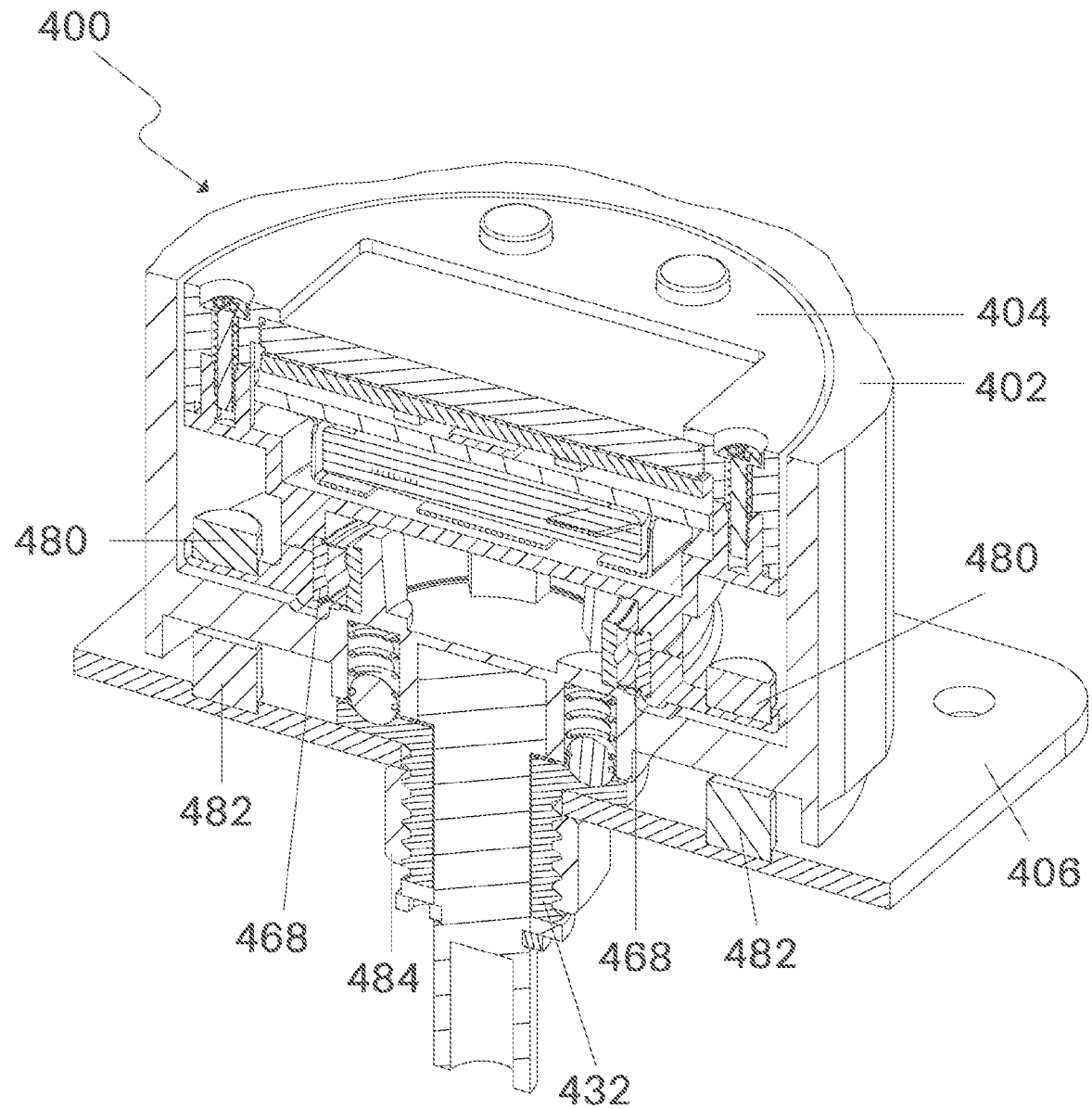
FIG. 4A shows a cross-sectional view of an alternative adjustment device according to a further embodiment of the present invention, the cross-sectional view substantially cutting through the centre of the adjustment device in a plane which is parallel with the electronic display.

As an alternative to the geared arrangement discussed in relation to FIGS. 1A to 1G above, FIG. 4A shows an alternative method of fixing the rotation of the inner housing (404) relative to the mounting portion (406).

In this embodiment, the inner housing (404) is provided with a first series of magnetic elements (480) that are attracted to a second series of magnetic elements (482) that are fixed to the mounting portion (406).

In this embodiment, as the outer housing (402) is rotated, the inner housing (404) is similarly encouraged to rotate. However, a low-friction connection is provided between the inner housing (404) and the outer housing (402) in the form of a bearing (468). This low-friction connection allows the attraction force between the first series of magnetic elements (480) and second series of magnetic elements (482) to overcome any friction between the inner housing (404) and outer housing (402) to ensure that the inner housing remains substantially stationary in use.

It will be understood that each series of magnetic elements (480, 482), may comprise one or more magnetic elements. Furthermore, the term "magnetic elements" should be broadly interpreted to mean any component which is providing a magnetic field or being influenced by a magnetic field. For example, both the first series of magnetic elements (480) and second series of magnetic elements (482) may be permanent ferromagnets or ferrimagnets. Alternatively, one series may be permanent ferromagnets, and the other may simply comprise ferromagnetic material such as iron.

A further advantage of this configuration, is that it allows the adjustment device (400) to be mounted in any orientation. If the adjustment device (400) is mounted with the inner housing (404) in the wrong orientation, then this may be corrected by rotating the inner housing directly with enough force to overcome the magnetic attraction force between the first series of magnetic elements (480) and the second series of magnetic elements (482).

Figure 4B:
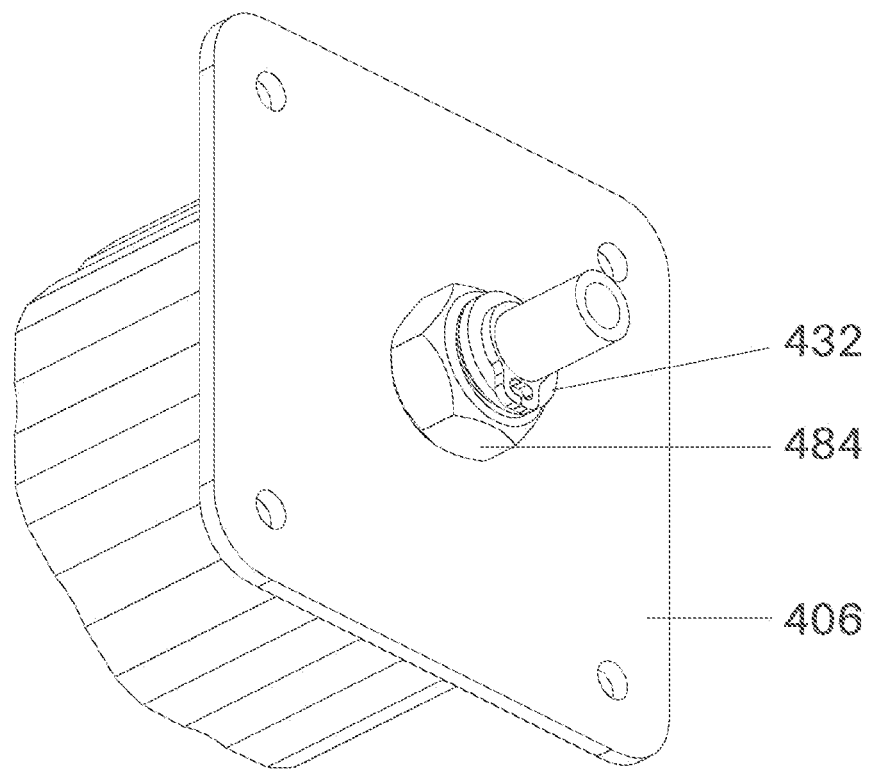
FIG. 4B shows a rear perspective view of the adjustment device of FIG. 4A.
Figure 4C:
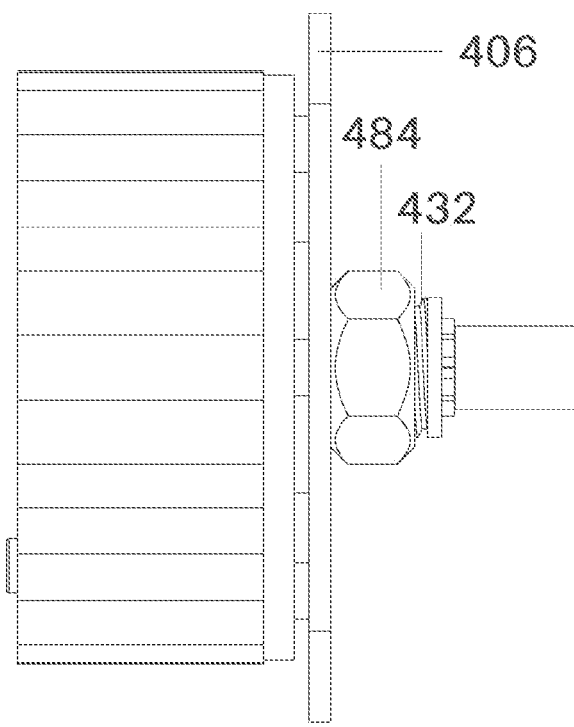
FIG. 4C shows a side view of the adjustment device of FIG. 4A.

Also shown in FIGS. 4A, 4B and 4C is an alternative method of securing the collar (432) to the mounting portion (406). In this embodiment the collar (432) has an external thread which may be engaged by a nut (484). To attach this arrangement to a surface, the collar (432) is passed through an aperture in the surface and the nut (484) tightened in place. This nut (484) clamps the surface against the collar securing the mounting portion (406) relative to the surface.

Second Embodiment of an Adjustment Mechanism

It is advantageous for the driver to be able to see at a glance how the brake bias has been configured within the vehicle. Accordingly, it is desirable to maximise the viewable area of the electronic display (116) within the body of the adjustment device. The embodiment of FIGS. 1A-1G show a configuration where the electronic display (116) has a substantially rectangular shape. This rectangular shape is preferable for displaying the bias setting in a large readable font. In this example, the internal configuration of the adjustment device (100) causes the inner housing (104) to remain static relative to the mounting portion (106) and as such the numbers shown on the electronic display (116) are always be shown in an upright position.

Figure 5A:
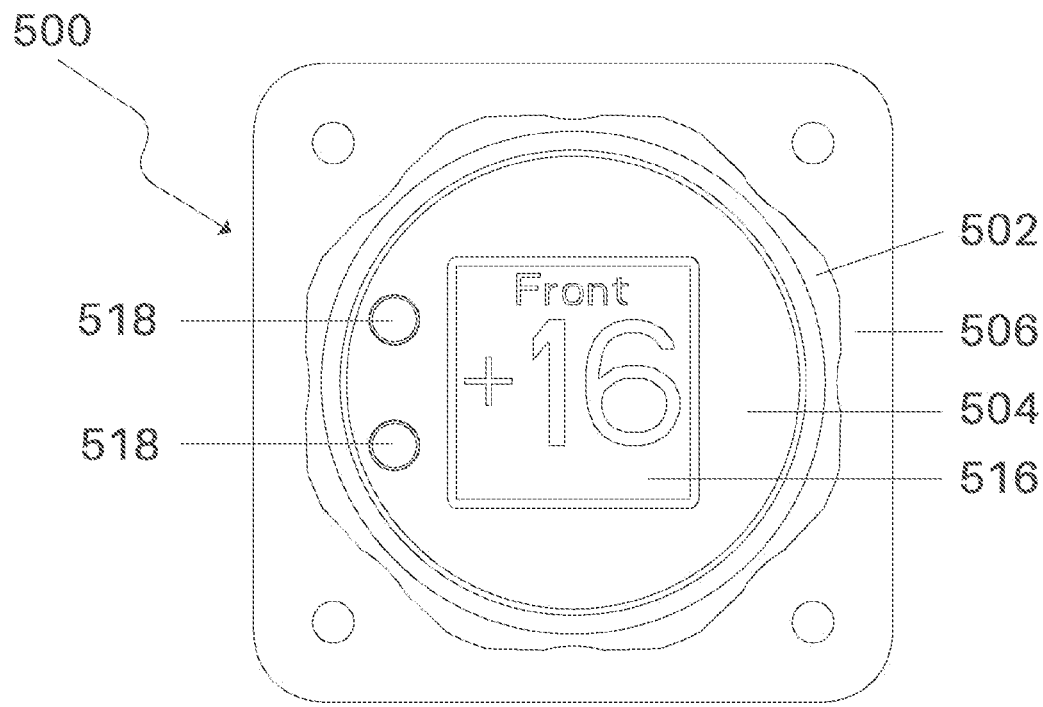
FIG. 5A shows a front view of an alternative adjustment device in a first position.
Figure 5B:
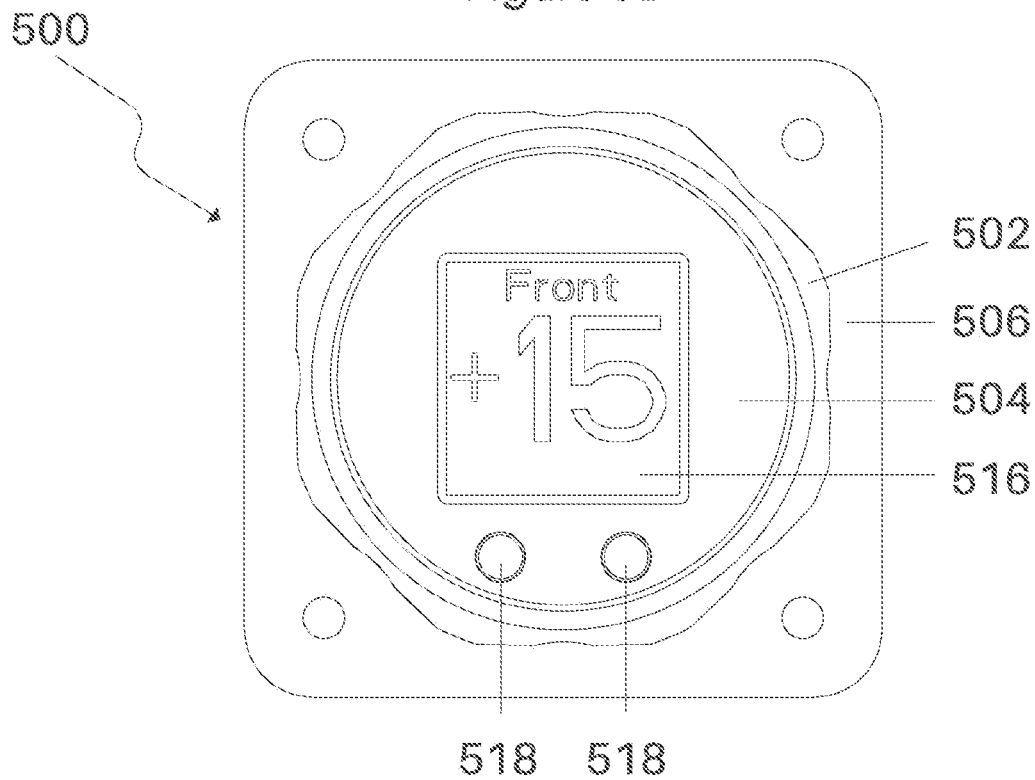
FIG. 5B shows a front view of the adjustment device of FIG. 5A in a second position.

FIGS. 5A and 5B illustrate an alternative embodiment, wherein the electronic display (516) within the adjustment device (500) rotates relative to the mounting portion (506) as the adjustment device (500) is rotated. This configuration allows for a simplified internal construction where the inner housing (504) can attach directly to the outer housing (502). Alternatively, the inner (504) and outer housing (502) may be replaced by a single component.

In this embodiment the electronic display (516) is substantially square. This configuration may be advantageous as the as the electronic display will appear the same to the driver, irrespective of whether the adjustment device (500) has been rotated 90, 180 or 270 degrees. Similarly, the electronic display could be replaced by a circular display as used in a smart wristwatch to allow for greater degrees of rotation while maintaining substantially the same appearance.

It may be desirable for the images shown on the electronic display (516) to be presented in a desired orientation, such as being upright. Doing so may allow the driver to more easily see at a glance the current configuration of the brake bias. One approach to achieve this is to redraw or re-render the images on the electronic display (516) as the adjustment device (500) is rotated thus maintaining the images in the desired orientation.

In the embodiment shown in FIGS. 5A and 5B, the orientation of the images is corrected in discrete steps. For example, the orientation of the images on the electronic display (516) may remain fixed relative to the electronic display, until the electronic display (516) has rotated a predetermined amount such as 90 degrees. This configuration may simplify the software and hardware required to implement this solution.

Alternatively, it may be advantageous to update the orientation of the images on the electronic display (516) more frequently, for example every 45 degrees. In doing so, the images displayed on the electronic display (516) may appear in a substantially upright orientation during rotation of the adjustment mechanism (101).

The electronic display (516) in this embodiment may be a pixel-based display such as an MIP LCD, rather than a segmented LCD display, as greater customisation of the images shown on the screen is achievable. Detecting the rotation of the adjustment device (500) may be achieved by any of the methods previously described. Alternatively, an accelerometer may be used to determine the upright orientation.

FIG. 5A shows the adjustment device (500) of this embodiment in a first position while FIG. 5B shows the adjustment device (500) rotated 90 degrees clockwise. In this example, a 90-degree rotation equates to one "click" or increment of the adjustment device, which is reflected by the numbers on the electronic display increasing by one.

It should also be noted that the interface (518) have also rotated about the centre of the adjustment device by 90 degrees. This could be overcome by separating these components from the inner housing (504) for example providing them externally to the adjustment device (500) or providing a separate mounting for these components on the mounting portion (506).

Alternatively, if the interface (518) comprises non-physical buttons (such as capacitive, resistive, or inductive touch), then the touch sensitive regions of the inner housing could be moved or adjusted to provide a consistent interface (518).

Alternative Embodiments of Attachment Portion

Figure 7A:
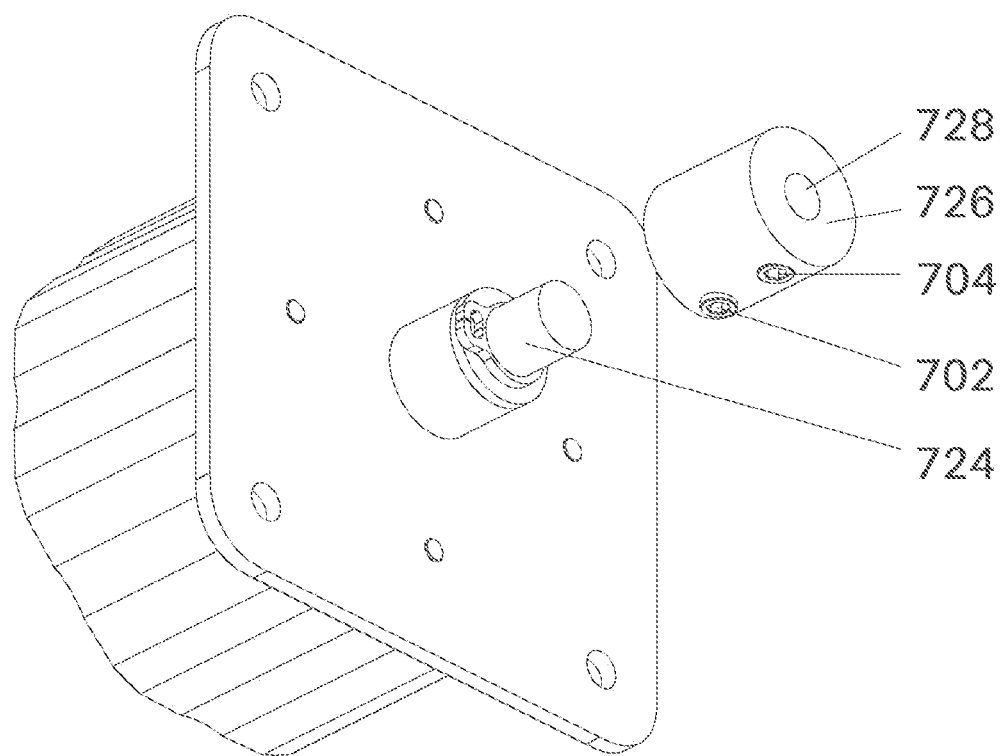
FIG. 7A shows a rear perspective view of a further alternative attachment portion with the components in a first position.

FIGS. 6, and 7A/7B show alternative methods of attaching to the rear portion of an adjustment device. These alternatives may be used in combination with any of the adjustment devices described herein.

FIG. 6, shows an adjustment device (600) which includes a series of fasteners (602) in the output shaft (624). In the embodiment shown, these fasteners (602) are grub screws, however this should not be seen as limiting on the invention and other fasteners may be used as previously described.

In use an external member, such as a flexible shaft is inserted into the aperture (626) in the adjustment device's output shaft (624). The fasteners (602) are then screwed into the external member in order to secure it in place.

FIG. 7A shows an alternative method of connecting to the output shaft (724) using an adapter (726). This adapter may have a constant or variable central bore (728). For example, one half of the adapter may have a wide bore to receive the output shaft (724) while the other half may have a narrower bore to receive the external member.

Figure 7B:
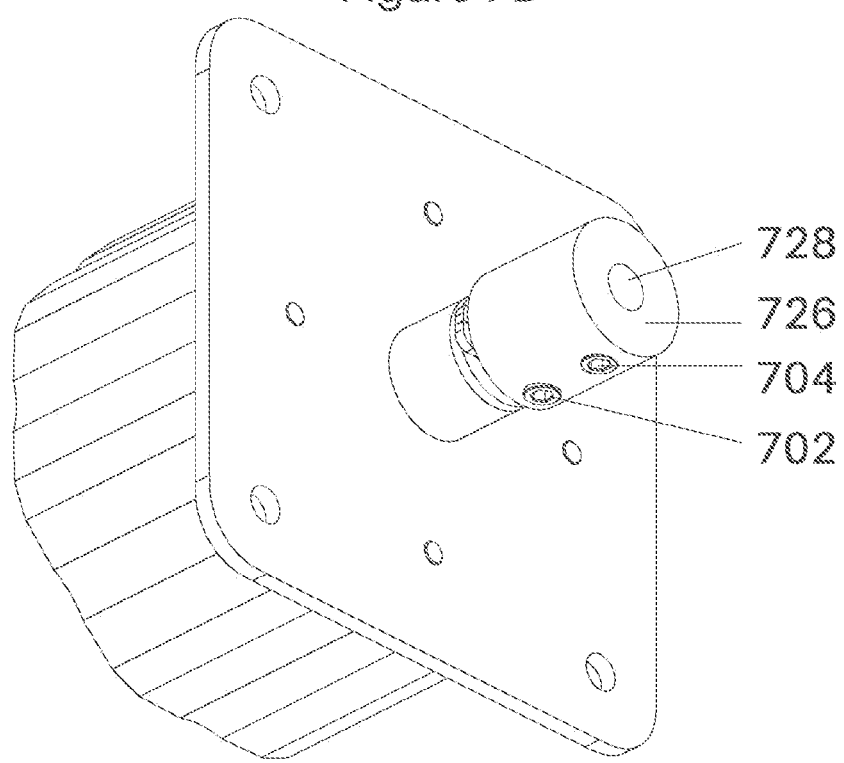
FIG. 7B shows a rear perspective view of the attachment portion of FIG. 7A with the components in a second position.

In use, as shown in FIG. 7B, the adapter (726) is slid onto the output shaft (724) and a first fastener (702) engaged to secure the adapter in place. An external member such as a flexible shaft (not shown) is then introduced into the second half of the adapter (726), and a second fastener engaged to secure the external member in place.

Alternative Embodiments of Mounting Portion

It should also be appreciated that the mounting portion is configured to be mounted to another component or object. It does not require that the mounting portion is a discrete component, rather it can be a region of another component.

Figure 8:
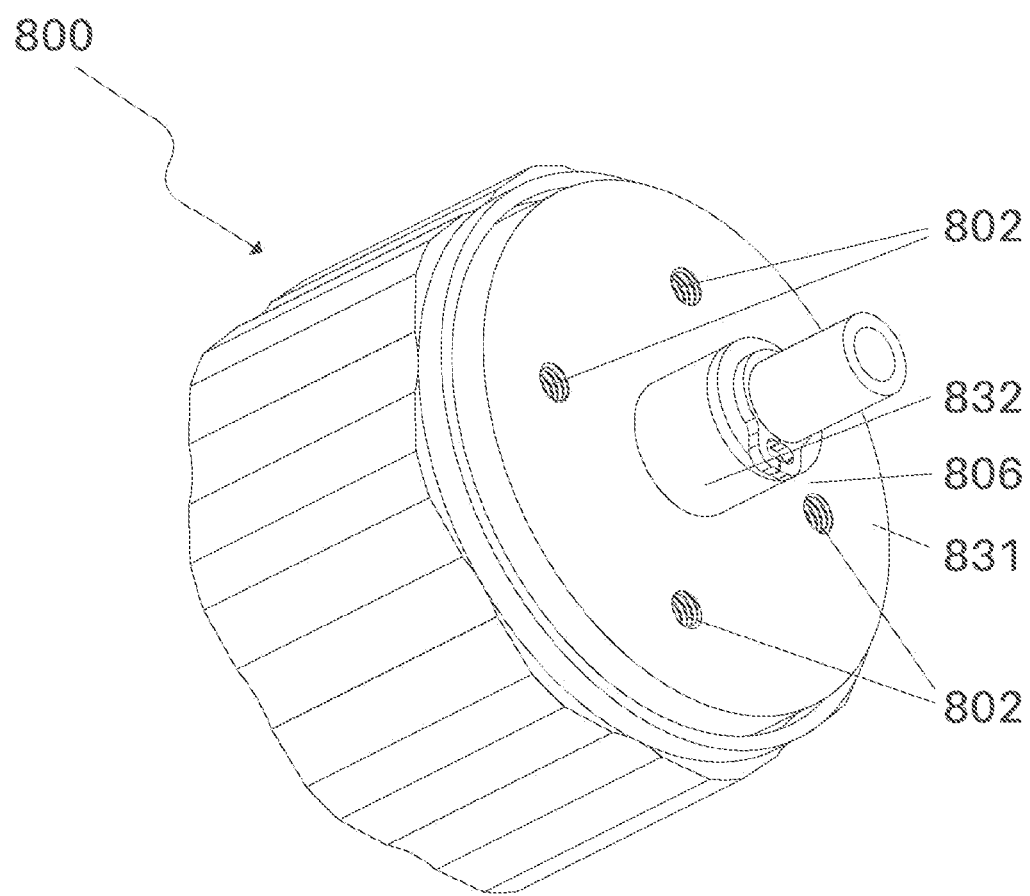
FIG. 8 shows a rear perspective view of an alternative mounting portion.

FIG. 8, shows an example of how a mounting portion may be provided in the flange (831) of a collar (832) of the adjustment device (800). In this embodiment a series of threaded apertures (802) provide a mounting portion, which may be used to secure the adjustment device (800).

Figure 9:
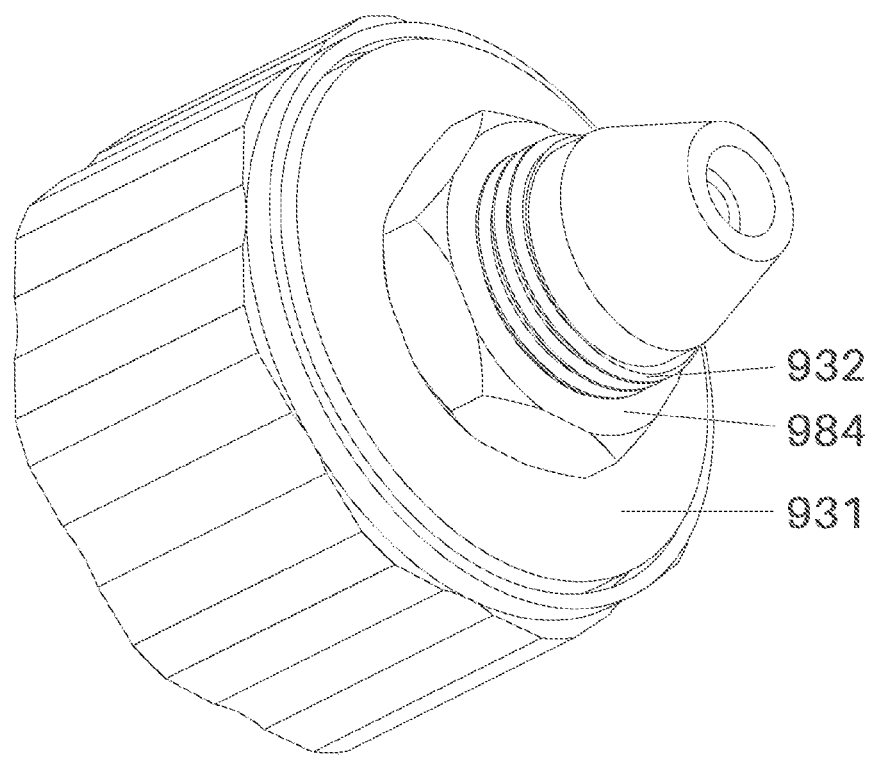
FIG. 9 shows a rear perspective view of a yet further alternative mounting portion.

FIG. 9, is a further alternate embodiment which is similar manner to FIG. 4 and uses an internally threaded nut (984) to provide a clamping force onto the flange (931) of the collar (932). This embodiment may be mounted to an external surface by passing the neck of the collar (932) through a hole a hole in an external surface and tightening the nut to clamp the external surface between the nut (984) and the flange (931) of the collar (932).

Alternative Embodiment of an Adjustment Device

FIGS. 10A to 10E show a yet further embodiment of an adjustment device (1000) according to the present invention.

In this embodiment the adjustment mechanism (1002) is a dial which is rotatably connected to the mounting portion (1006). Included is an electronic display (1016) and an interface (1018), however unlike previous embodiments, these are provided externally to the adjustment mechanism (1002).

Figure 10A:
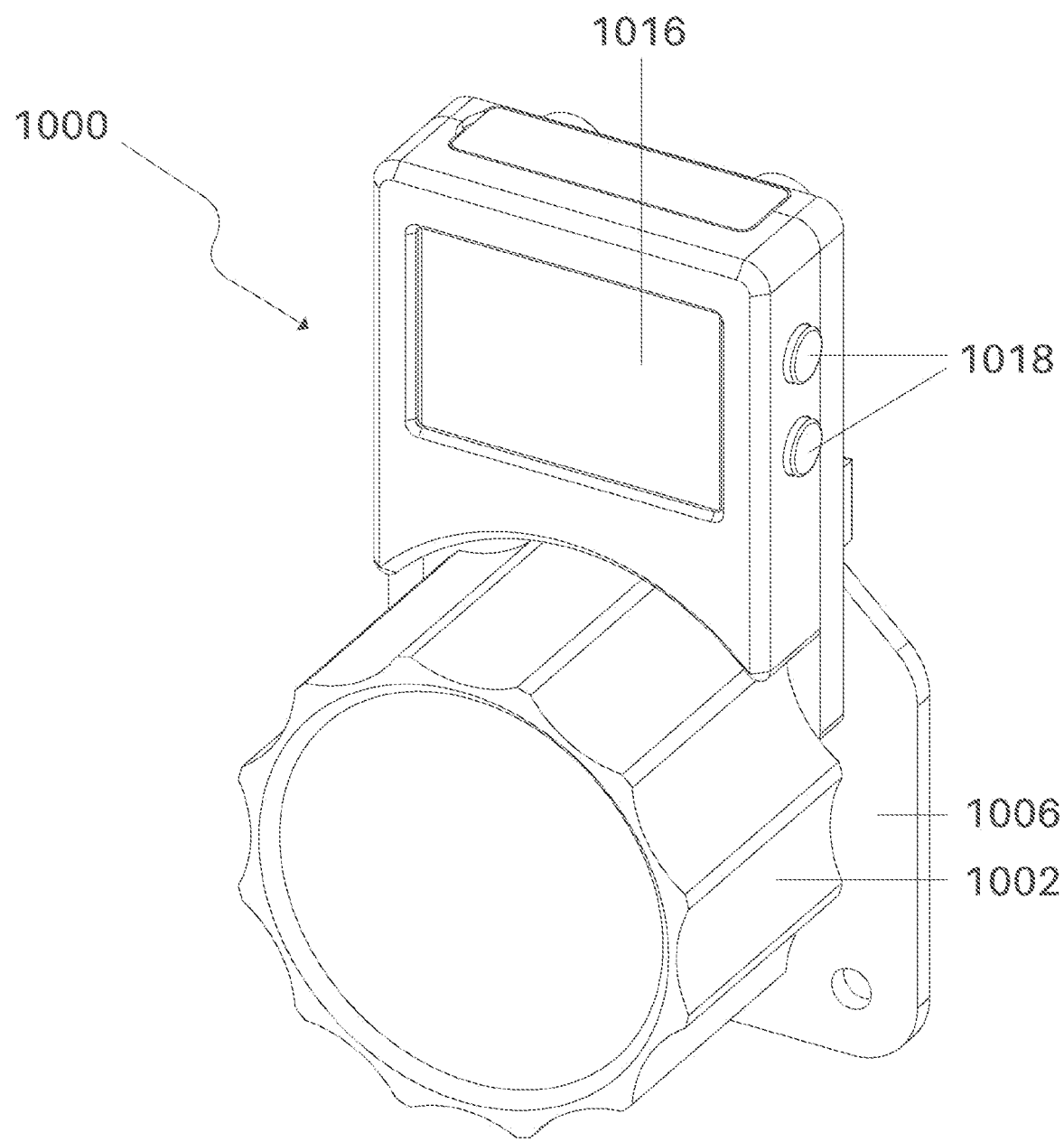
FIG. 10A shows a perspective view of an alternative embodiment of an adjustment device.
Figure 10B:
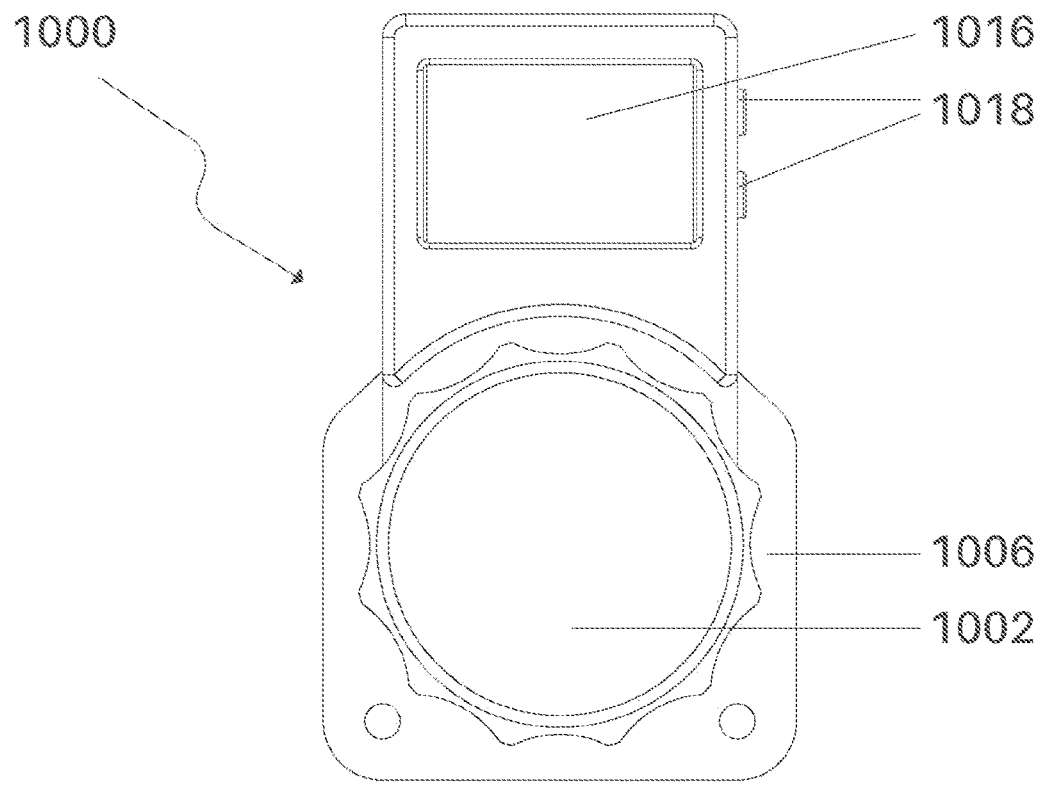
FIG. 10B shows a front view of the adjustment device of FIG. 10A.
Figure 10C:
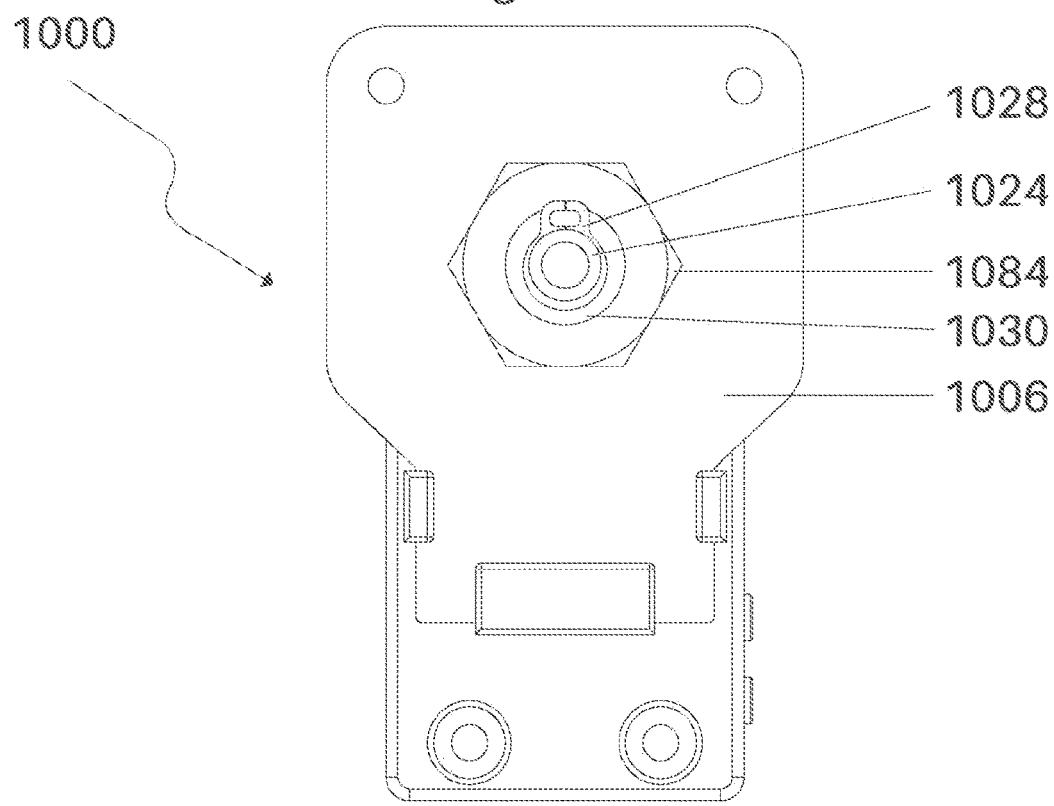
FIG. 10C shows a rear view of the adjustment device of FIG. 10A.
Figure 10D:
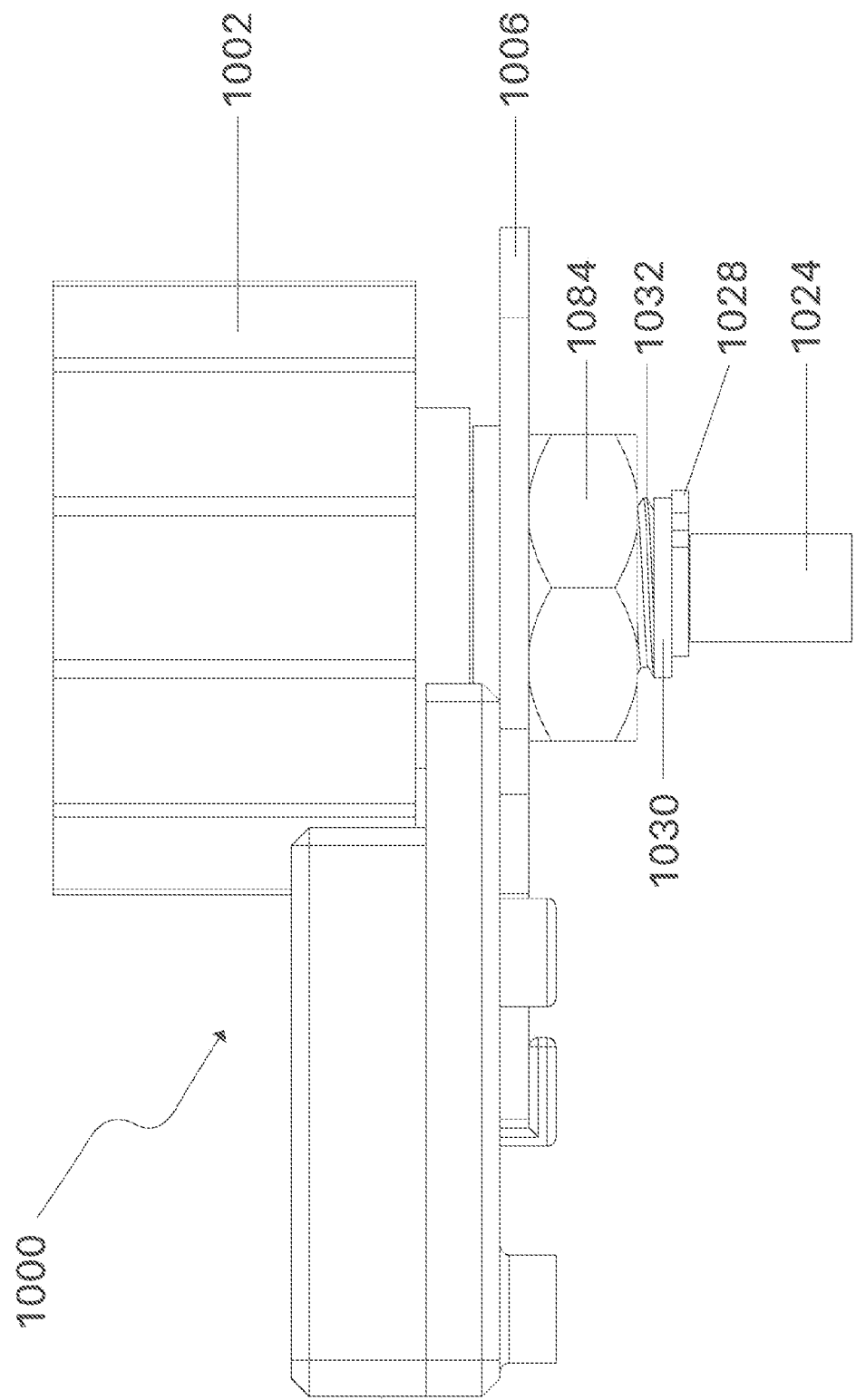
FIG. 10D shows a side view of the adjustment device of FIG. 10A.

FIGS. 10B, 10C and 10D show front, rear and side views of same.

Figure 10E:
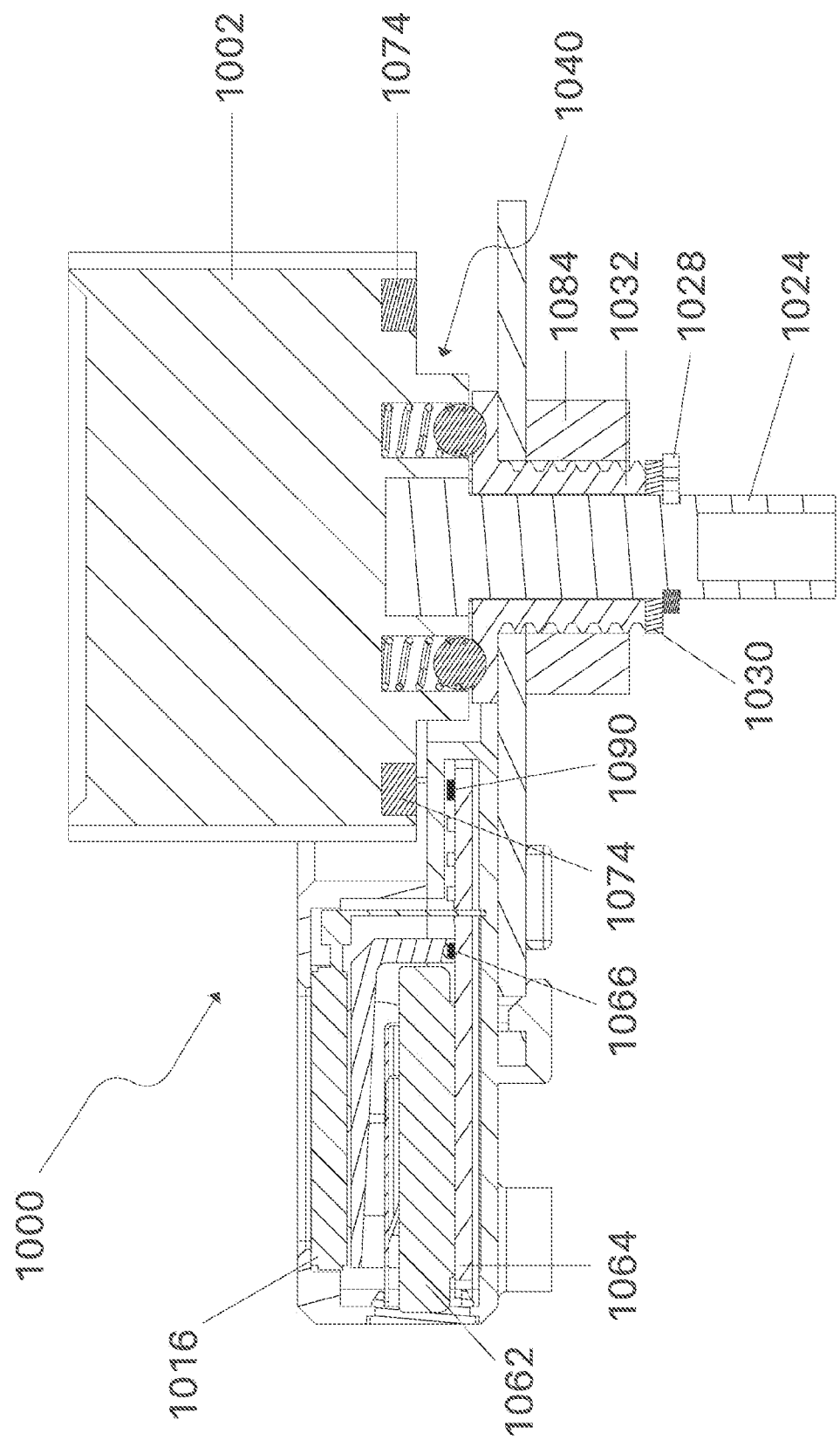
FIG. 10E shows a side cross-sectional view of the adjustment device of FIG. 10A, the cross section running through the longitudinal centre line of the adjustment device.

FIG. 10E provides a cross-sectional view of the internals of the adjustment device (1000). From this view it can be seen that the internal construction of the adjustment mechanism (1002) includes tactile feedback mechanisms as previously described.

The adjustment mechanism (1002) is also provided with a series of magnets (1074) which allow a hall-effect sensor (1090) on the PCB (1064) to detect the rotation of the adjustment mechanism (1002).

Also, clearly visible in cross section is the electronic display (1016), power source in the form of a battery (1062) and lighting source in terms of backlighting (1066).

Further Alternative Embodiment of an Adjustment Mechanism

Figure 11:
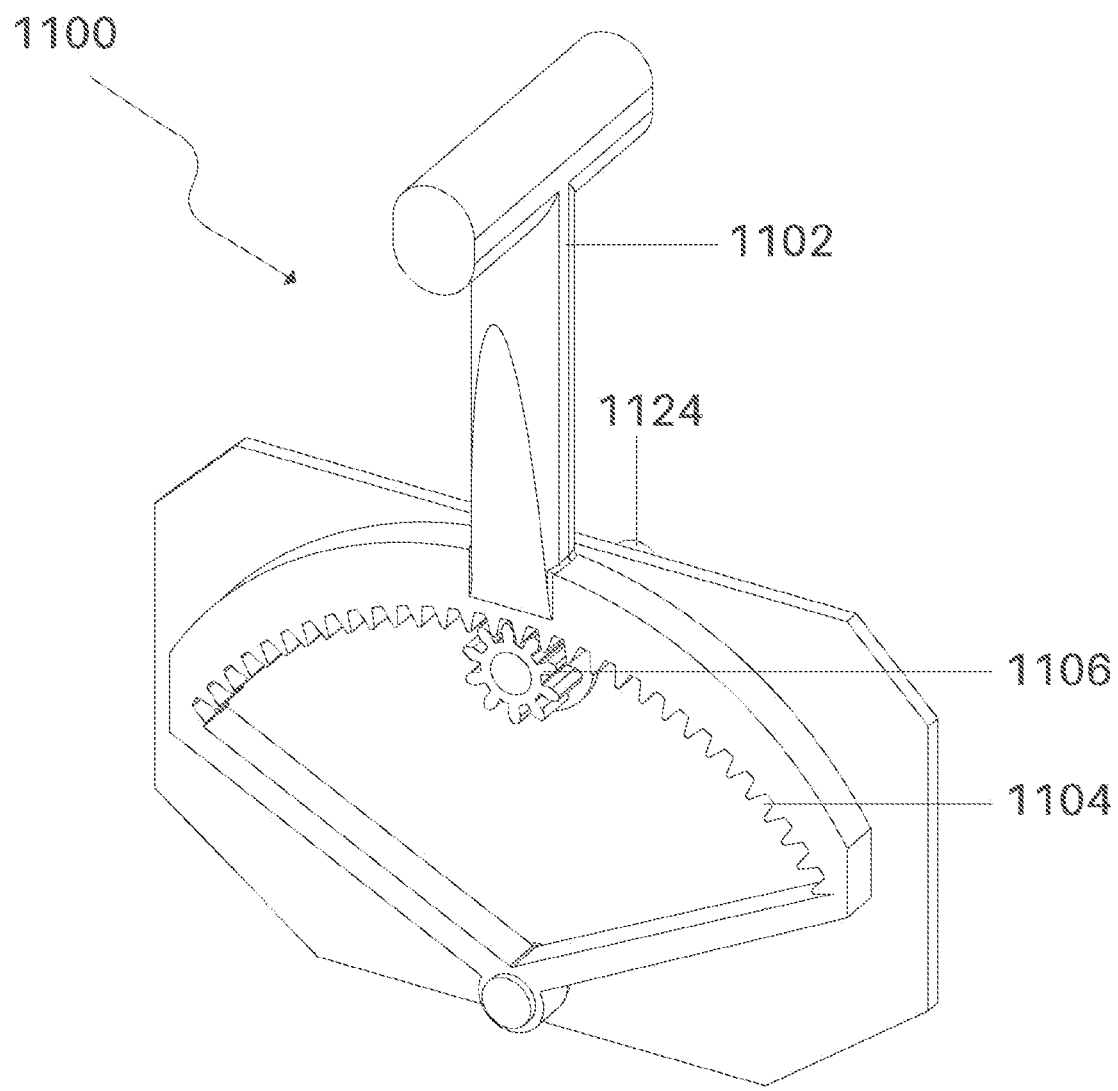
FIG. 11 shows a perspective view of an alternative actuation means for an adjustment device according to the present invention.

Referring now to FIG. 11 which shows an alternative adjustment mechanism (1100) in the form of a lever (1102). This lever has a series of teeth (1104) which engage with a gear (1106) connected to the output shaft (1124).

In use, arcuate movement of the lever (1102), causes counter rotation in the gear (1106), which in turn rotates the shaft (1124). As such, this system offers an alternative adjustment mechanism to the rotary dials of the previous embodiments.

Alternate Embodiment of an Adjustment Device

Figure 12:
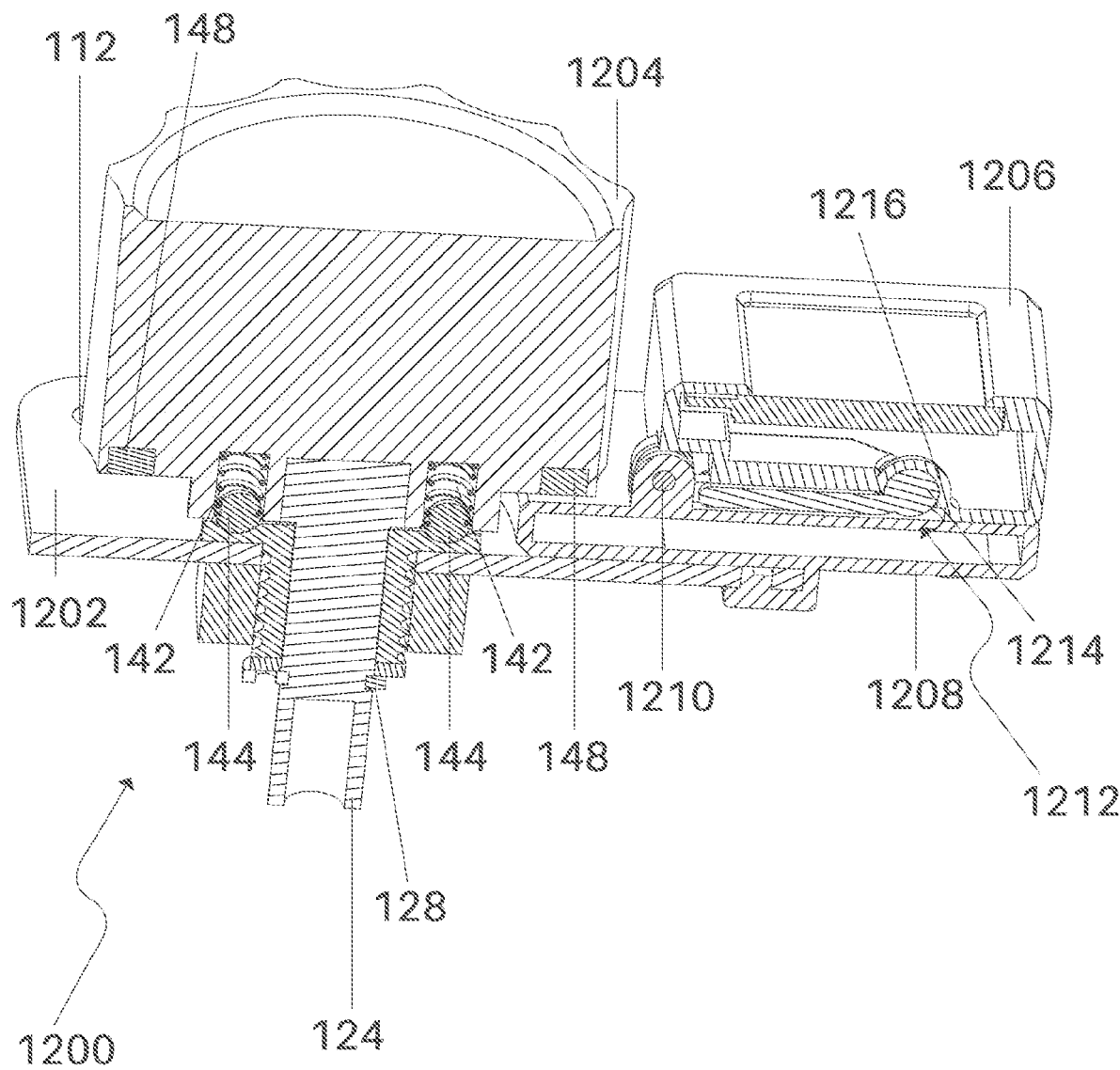
FIG. 12 shows a cross-sectional view of an alternative embodiment of an adjustment device according to the present invention, the cross section running through the longitudinal centre-line of the adjustment device.

Referring now to FIGS. 12 and 13 which show an alternative embodiment of an adjustment device (1200) according to an aspect of the invention.

The adjustment device (1200) includes a mounting portion (1202) and an adjustment mechanism (1204). In the embodiment of FIGS. 12 and 12, the adjustment mechanism (1204) is a dial that is rotatably connected to the mounting portion (1202). The dial may be any suitable dial which can be engaged and rotated by a user.

The adjustment mechanism includes an attachment portion (not shown in FIGS. 12 and 13) which allows movement of the adjustment mechanism (1202) to be transferred to another component of a control system (not shown in FIGS. 12 and 13).

A display (1206) e.g. an electronic display screen, is attached to the mounting portion (1202) by an arm (indicated generally as (1208)).

The arm (1208) includes a first joint (1210) which moveably attaches the display (1206) to the arm (108). The first joint (1210) may be a hinge, a ball and socket joint or any other suitable form of joint to provide movement of the display (1206) relative to the mounting portion (1202).

The arm (1208) includes a second joint (1212) which is on the distal side of the first joint (1210) to the adjustment mechanism (1204). The second joint (1212) allows the orientation of the display (1206) to be adjusted relative to mounting portion (1202). In the embodiment of FIGS. 12 and 13, the second joint (1212) comprises a ball (1214) which is movably received in a corresponding socket (1216).

As shown in FIG. 13, the first joint (1210) and the second joint (1212) facilitate the orientation of the display (1206) relative to the mounting portion (1202), and therefore also relative to the orientation of the adjustment mechanism (1204).

Adjusting at least one of the position and orientation of the display (1206) may provide an adjustment device (1200) which better meets a user's needs or preference. For instance, the location of the display (1206) can be optimised to ensure it is easily visible according to where the mounting portion (1202) is located in use, a user's height or to avoid other obstructions.

Further Alternate Embodiment of an Adjustment Device

Referring now to FIGS. 14A to 14D which show a further alternate embodiment of an adjustment device (1300) according to an embodiment of the invention.

The adjustment device (1300) is substantially similar to the adjustment device (100) according to FIGS. 1A to 1G. Therefore, like references refer to like components.

Figure 14A:
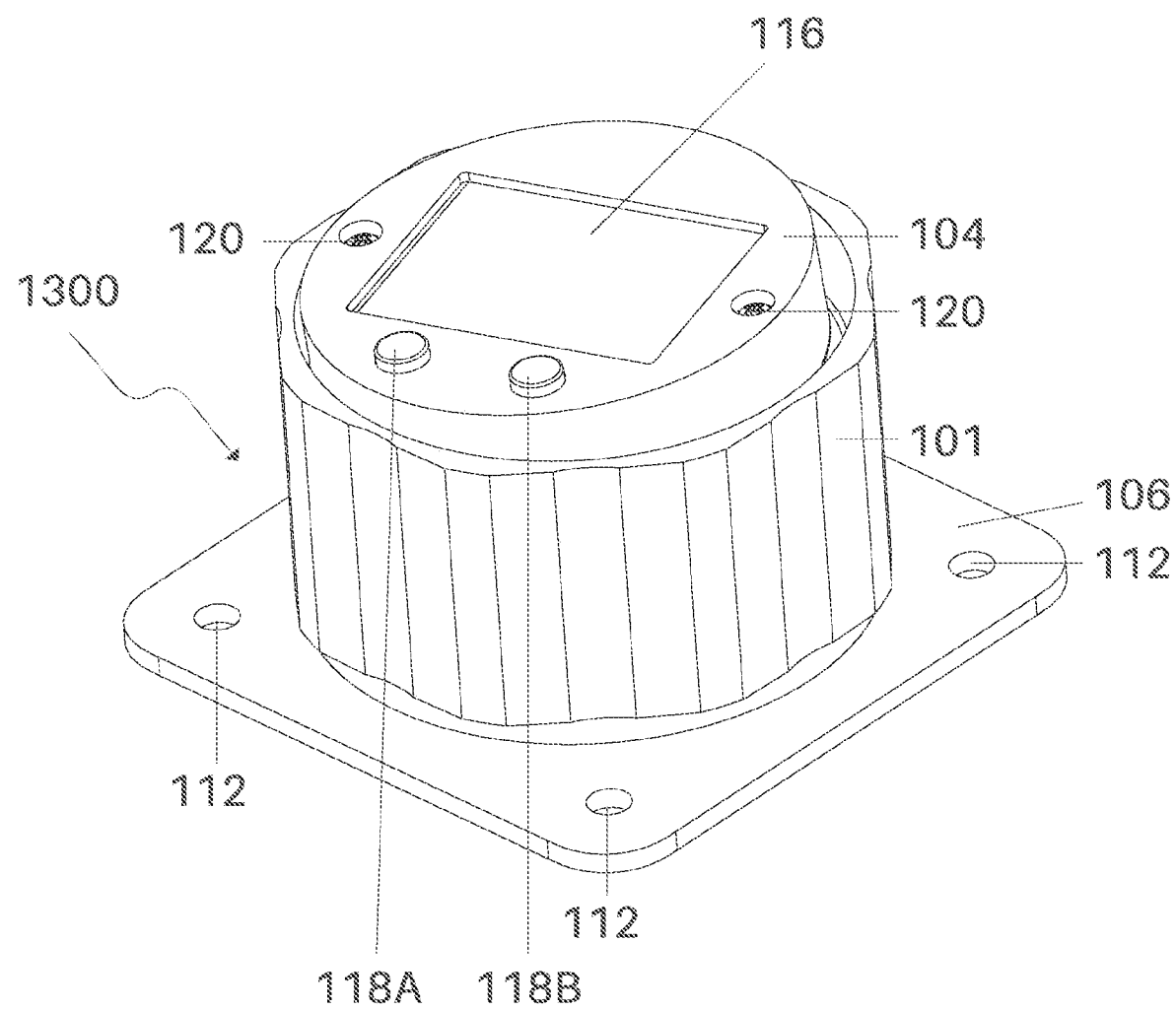
FIG. 14A shows a perspective view of a further alternative embodiment of an adjustment device according to the present invention having a display in a first orientation.
Figure 14B:
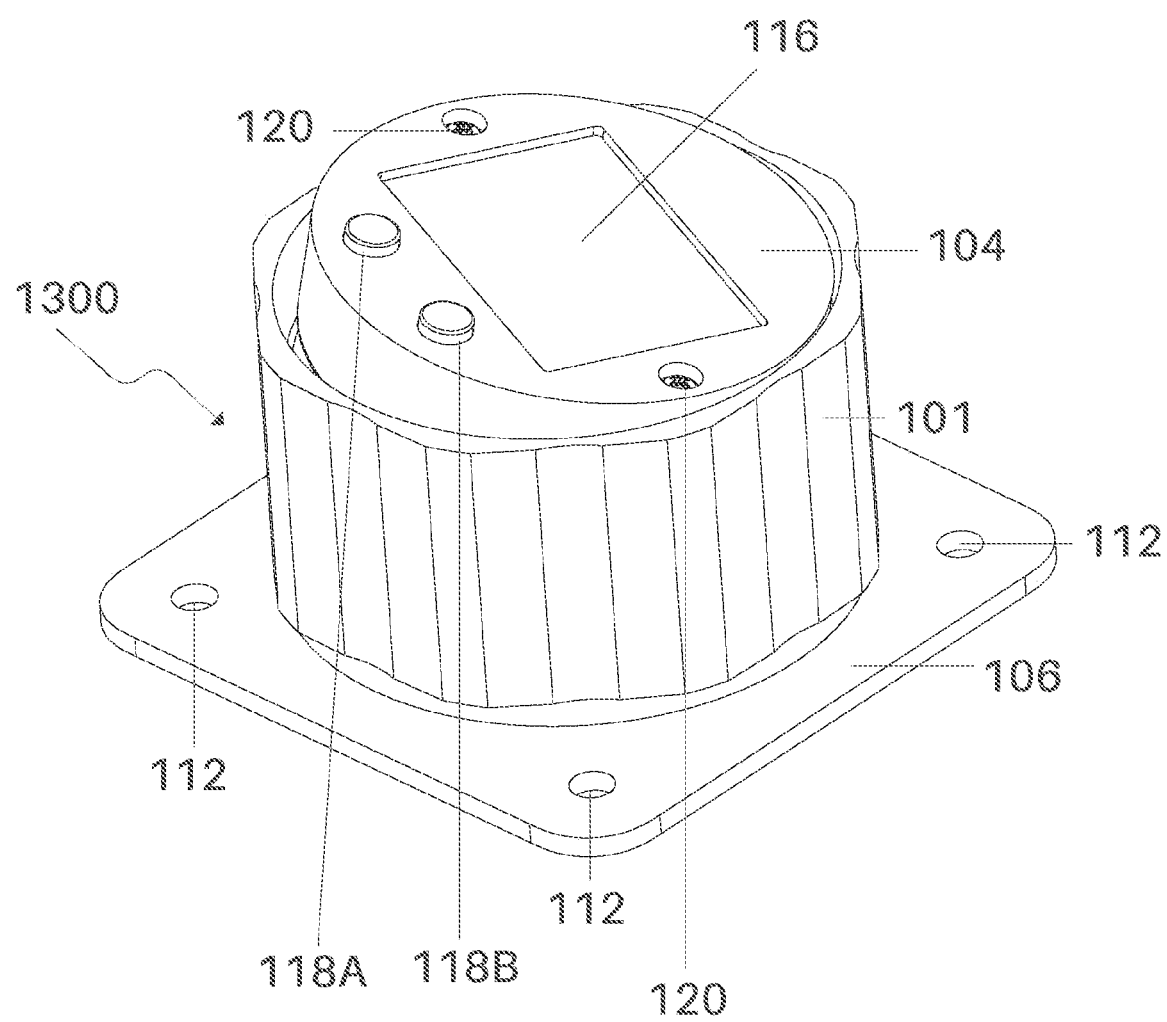
FIG. 14B shows a perspective view of the adjustment mechanism of FIG. 14A having the display in a second orientation.
Figure 14C:
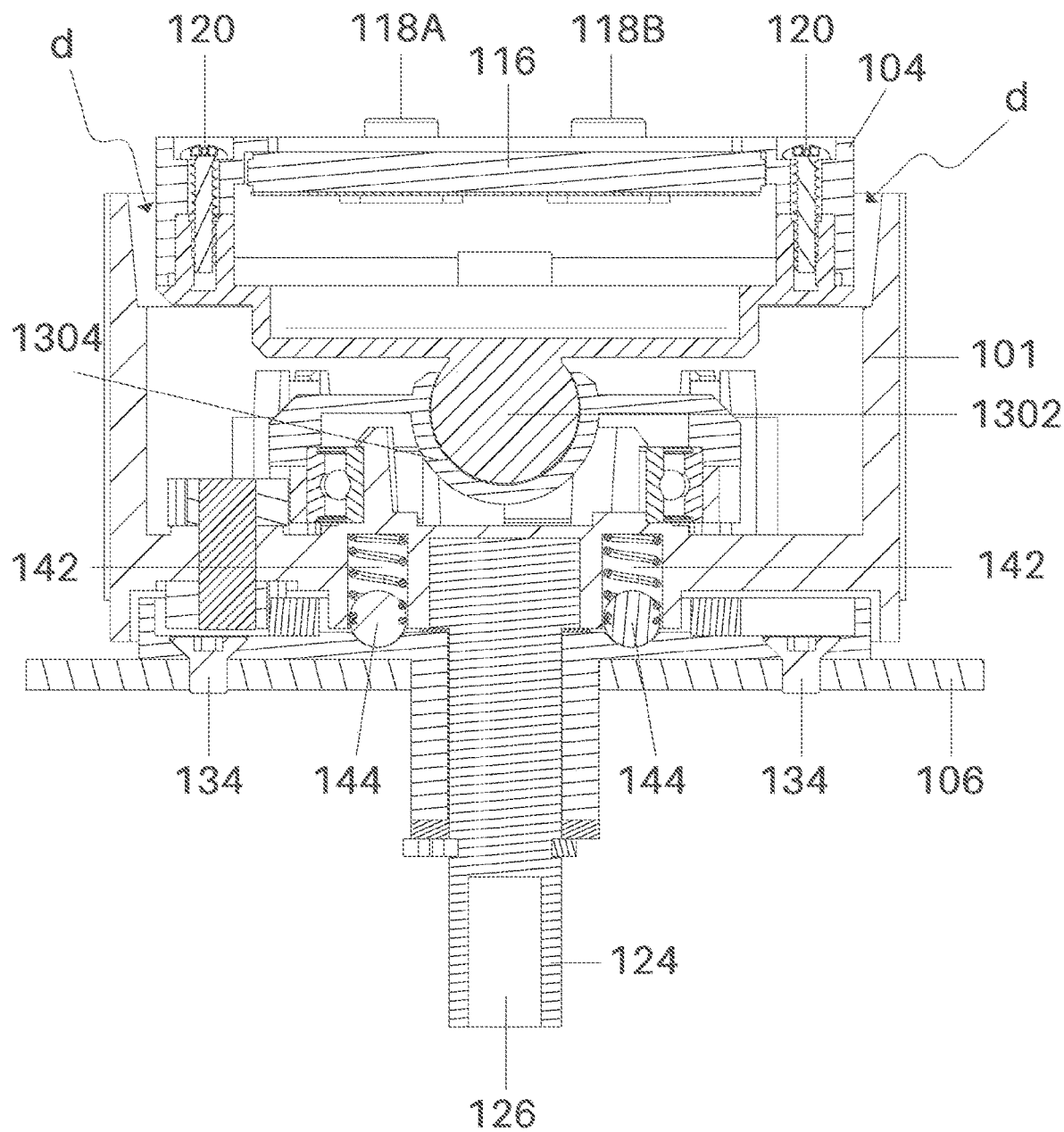
FIG. 14C shows a cross-sectional view of the adjustment mechanism of FIGS. 14A and 14B, the cross-sectional view substantially cutting through the centre of the adjustment device in a plane which is parallel with the electronic display.
Figure 14D:
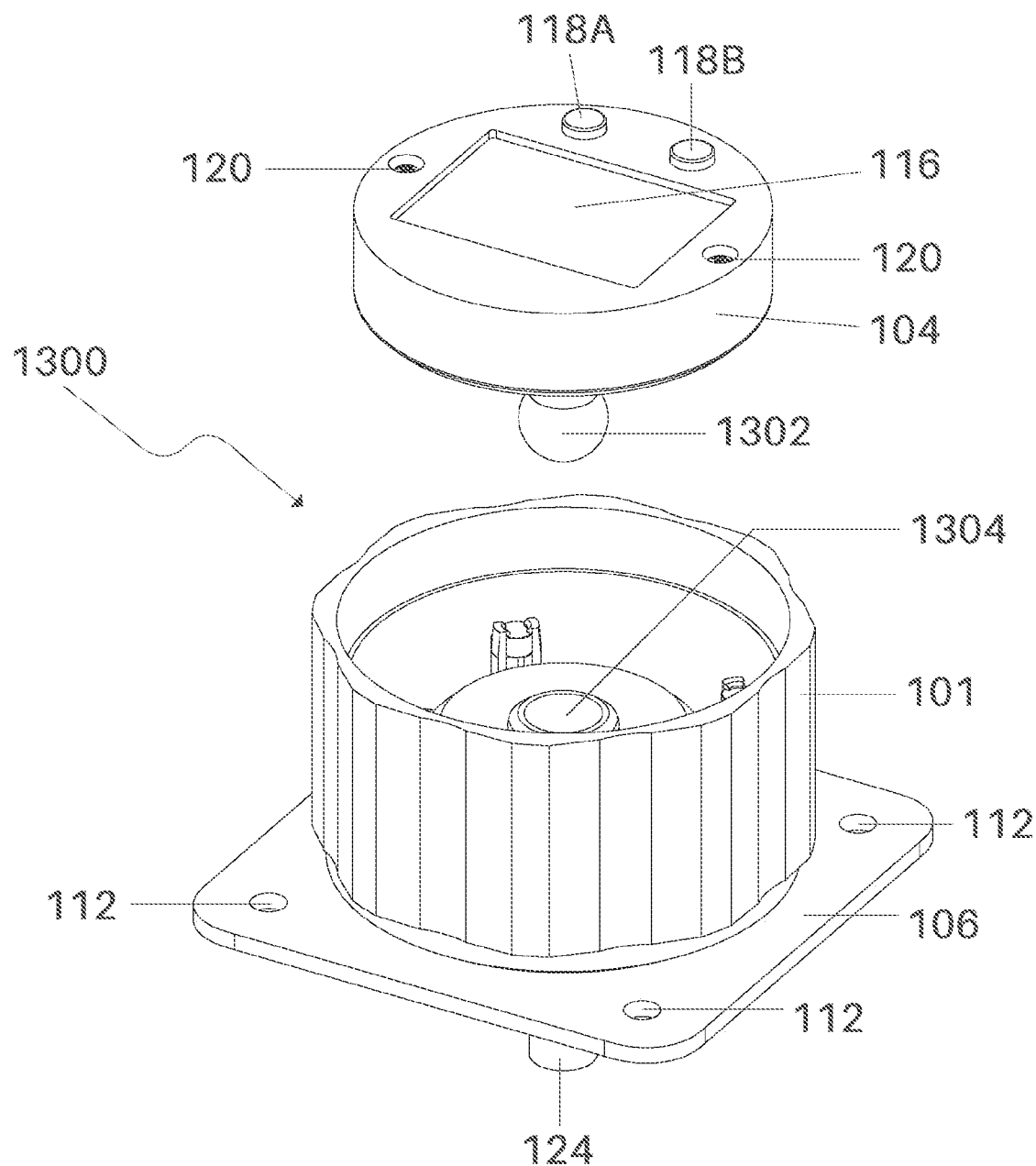
FIG. 14D shows an exploded view of the adjustment mechanism of FIGS. 14A to 14C.

However, an electronic display (116) is mounted to the mounting portion (106) using an adjustment mechanism to enable the orientation of the electronic display (116) with respect to a plane (not shown in the Figures) to be adjusted. For instance, the electronic display (116) is mounted in the inner housing (104), and the inner housing (104) is movably mounted to the mounting portion (106) so that the inner housing (104) may be tilted to a first orientation as is shown in FIG. 14A, or a second orientation as is shown in FIG. 14B. This facilitates changing the orientation of the electronic display (116) relative to the mounting portion (106). It should also be appreciated that the first and second orientations for the inner housing (104) may be continuous between e.g. the orientations are not predefined.

In the embodiment of FIGS. 14A to 14D, the inner housing (104) is movably mounted to the mounting portion (106) by a ball (1302) on an underside of the inner housing (104) which is received in a corresponding cup (1304) provided on the mounting portion (106). Is should also be appreciated that the cup (1304) and ball (1302) may be reversed and provided on the other component.

The plane may be any plane e.g. a plane in which the mounting portion (106) lies or some other reference plane.

In the embodiment of FIGS. 14A to 14D there is a clearance (d) between the adjustment mechanism (101) and the inner housing (104). For instance, the clearance (d) to ensure that the adjustment mechanism (101) and the inner housing (104) do not touch each other as the inner housing (104) is tiled between the first orientation and the second orientation.

This may facilitate a user more easily viewing the electronic display (116) when the adjustment device (1300) is in use.

It will be understood by those skilled in the art that other suitable adjustment systems may be combined to provide the rotational force to the shaft, and that the examples provided should not be considered limiting on the invention.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

What we claim is:

1. A device for the adjustment of brake bias in a vehicle, the device comprising:
    a mounting;
    an adjustment mechanism comprising an outer housing configured to rotate, and an inner housing comprising an electronic display;
    a rotation prevention arrangement; and
    an attachment portion configured to in use attach to a shaft that is operatively connected to a brake bias control system,
    wherein in use, rotation of the adjustment mechanism causes mechanical torque to be transferred to the attachment portion and to thereby cause rotation of the shaft when attached thereto,
    wherein the rotation prevention arrangement operatively connects the inner housing to the mounting, so as to prevent rotation of the inner housing during rotation of the outer housing to thereby maintain the inner housing in a rotationally fixed orientation with respect to the mounting,
    wherein the electronic display is configured to provide an indication of the brake bias, and
    wherein the rotation prevention arrangement comprises a geared connection operatively connecting the mounting and the inner housing of the adjustment mechanism to thereby keep the inner housing rotationally fixed relative to the mounting.

2. The device of claim 1, wherein the electronic display is mounted at least partially within the adjustment mechanism.

3. The device of claim 1, wherein the orientation of the electronic display is fixed relative to the mounting.

4. The device of claim 1, wherein the adjustment mechanism comprises hand engagement portions.

5. The device of claim 1, further comprising a power source selected from the group consisting of a battery power and an external power connection.

6. The device of claim 1, further comprising at least one interface.

7. The device of claim 6, wherein the interface includes a feature for zeroing a number displayed on the electronic display.

8. The device of claim 6, wherein the interface is at least partially located in the inner housing of the adjustment mechanism.

9. The device of claim 1, wherein the shaft is permanently attached to the attachment portion.

10. The device of claim 1, wherein the shaft is releasably connected to the attachment portion.

11. The device of claim 1, further comprising a feedback mechanism configured to provide tactile and/or audible feedback.

12. The device of claim 1, further comprising a sensing arrangement to detect rotation of the adjustment mechanism.

13. The device of claim 12, wherein the sensing arrangement comprises at least one source and at least one receiver.

14. The device of claim 13, wherein the source is attached to the outer housing of the adjustment mechanism and the receiver is attached to the inner housing of the adjustment mechanism.

15. The device of claim 1, wherein the device is configured to display on the electronic display an indication that increases as the adjustment mechanism is rotated in a first direction, and further wherein the device is configured to display on the electronic display an indication that decreases as the adjustment mechanism is rotated in a second direction.

16. The device of claim 1, wherein the indication of the brake bias is displayed as a count of the number of times the adjustment mechanism has been rotated through a predefined number of degrees.

17. A device for the adjustment of brake bias in a vehicle, the device comprising:
- a mounting;
- an adjustment mechanism comprising an outer housing configured to rotate, and an inner housing comprising an electronic display;
- a rotation prevention arrangement; and
- an attachment portion configured to in use attach to a shaft that is operatively connected to a brake bias control system,
- wherein in use, rotation of the adjustment mechanism causes mechanical torque to be transferred to the attachment portion and to thereby cause rotation of the shaft when attached thereto,
- wherein the rotation prevention arrangement operatively connects the inner housing to the mounting, so as to prevent rotation of the inner housing during rotation of the outer housing to thereby maintain the inner housing in a rotationally fixed orientation with respect to the mounting,
- wherein the electronic display is configured to provide an indication of the brake bias, and
- wherein the rotation prevention arrangement comprises two or more magnetic elements, wherein the magnetic attraction forces between the two or more magnetic elements operatively connects the inner housing to the mounting to thereby maintain the inner housing is a rotationally fixed orientation with respect to the mounting as the adjustment mechanism is rotated.

18. The device of claim 17, wherein the electronic display is mounted at least partially within the adjustment mechanism.

19. The device of claim 17, wherein the orientation of the electronic display is fixed relative to the mounting.

20. The device of claim 17, wherein the adjustment mechanism comprises hand engagement portions.

21. The device of claim 17, further comprising a power source selected from the group consisting of a battery power and an external power connection.

22. The device of claim 17, further comprising at least one interface.

23. The device of claim 22, wherein the interface includes a feature for zeroing a number displayed on the electronic display.

24. The device of claim 22, wherein the interface is at least partially located in the inner housing of the adjustment mechanism.

25. The device of claim 17, wherein the shaft is permanently attached to the attachment portion.

26. The device of claim 17, wherein the shaft is releasably connected to the attachment portion.

27. The device of claim 17, further comprising a feedback mechanism configured to provide tactile and/or audible feedback.

28. The device of claim 17, further comprising a sensing arrangement to detect rotation of the adjustment mechanism.

29. The device of claim 28, wherein the sensing arrangement comprises at least one source and at least one receiver.

30. The device of claim 29, wherein the source is attached to the outer housing of the adjustment mechanism and the receiver is attached to the inner housing of the adjustment mechanism.

31. The device of claim 17, wherein the device is configured to display on the electronic display an indication that increases as the adjustment mechanism is rotated in a first direction, and further wherein the device is configured to display on the electronic display an indication that decreases as the adjustment mechanism is rotated in a second direction.

32. The device of claim 17, wherein the indication of the brake bias is displayed as a count of the number of times the adjustment mechanism has been rotated through a predefined number of degrees.

* * * * *